United States Patent [19]

Flusche et al.

[11] 4,394,731
[45] Jul. 19, 1983

[54] CACHE STORAGE LINE SHAREABILITY CONTROL FOR A MULTIPROCESSOR SYSTEM

[75] Inventors: Frederick O. Flusche; Richard N. Gustafson, both of Hyde Park; Bruce L. McGilvray, Pleasant Valley, all of N.Y.

[73] Assignee: International Business Machines Corporation, Armonk, N.Y.

[21] Appl. No.: 205,500

[22] Filed: Nov. 10, 1980

[51] Int. Cl.³ .............................................. G06F 15/16
[52] U.S. Cl. .................................................... 364/200
[58] Field of Search ......................... 364/200 MS File

[56] References Cited
U.S. PATENT DOCUMENTS

| | | | |
|---|---|---|---|
| 3,723,976 | 3/1973 | Alvarez et al. | 364/200 |
| 3,735,360 | 5/1973 | Anderson et al. | 364/200 |
| 3,771,137 | 11/1973 | Barner et al. | 364/200 |
| 4,056,844 | 11/1977 | Izumi | 364/200 |
| 4,136,386 | 1/1979 | Annunziata et al. | 364/200 |
| 4,322,795 | 3/1982 | Lange et al. | 364/200 |

*Primary Examiner*—Raulfe B. Zache
*Attorney, Agent, or Firm*—Bernard M. Goldman

[57] ABSTRACT

A multiprocessor (MP) system is described having central processors (CPs) in which each CP has a store-in-cache (SIC) with an associated processor directory (PD). Each PD has a plurality of line entries which define the content of corresponding line positions in the associated SIC. Each line entry has an associated data shareability control bit, designated EX, which may be set to a one or zero state to indicate, respectively, the exclusive (EX) or readonly (RO) state of the associated line. An exclusive line is not shareable, but a readonly line is shareable i.e. may exist validly in more than one SIC in the MP. Any CP in the MP can request data in an EX state from its SIC, which data may or may not be found in its SIC or in another CP's SIC. If a CP requests a line of storage data in EX state and the line is found in EX state in another CP's SIC, it may be allowed to remain in the other CP's SIC by being set to RO state in both CPU SICs for the situations in which: (1) the line is found unchanged in EX state in the other CP's SIC, or (2) the line is found in RO state in the other CP's SIC, in which case the line is received and set to RO state in the requesting SIC even though requested in EX state. But if the line is found to be changed in the other CP's SIC, its shareability designation in the requesting SIC will be EX and the line is invalidated in the other CP's SIC from where it is castout.

16 Claims, 34 Drawing Figures

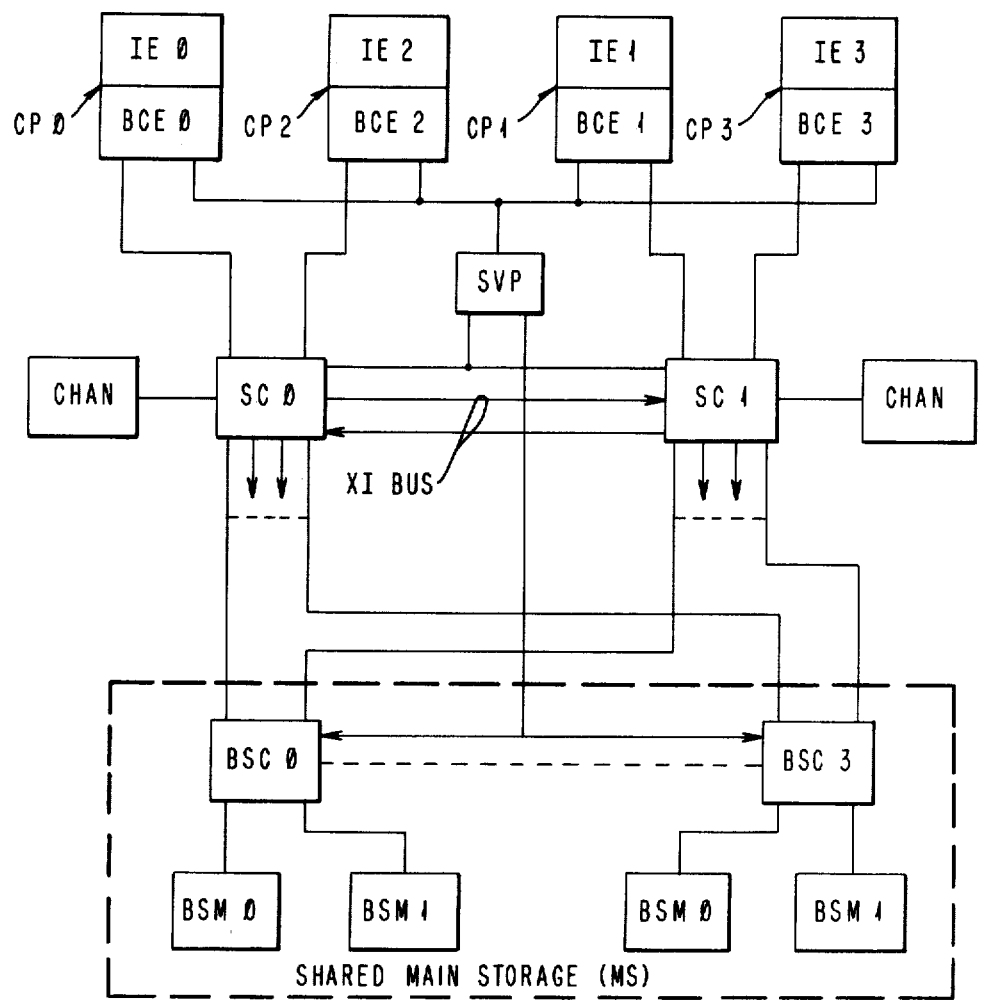

FIG. 3A
IE CMD TO BCE

| PSW STORAGE KEY | LOGICAL ADDRESS | SI REQ | FETCH REQ | EX (RO) REQ | STORE CACHE SIG |
|---|---|---|---|---|---|
| (4 BITS) | (32 BITS) | (1 BIT) | (1 BIT) | (1 BIT) | (1 BIT) |

FIG. 3B
BCE MISS CMD TO SC

| PSW STORAGE KEY | LOG BIT(S) 19,20 | ABS ADDR | /// | PD SET (LRU RESULT) | OP CODE (LINE FETCH) | DW LNTH | SI REQ | EX SIG | PROC ID |
|---|---|---|---|---|---|---|---|---|---|
| (4 BITS) | (2 BITS) | (26 BITS) | | (4 BITS) | (8 BITS) | (4 BITS) | (1 BIT) | (1 BIT) | (2 BITS) |

FIG. 3C
SC CMDS TO BCE

| CD CLASS | CD SET | INV CMD | ARO CMD | CO CMD |
|---|---|---|---|---|
| (6 BITS) | (4 BITS) | (1 BIT) | (1 BIT) | (1 BIT) |

FIG. 3D
BCE DIRECTORY CMDS TO SC

| PSW STORAGE KEY | LOG BITS 19,20 | ABS ADDR | PD CLASS | PD SET | OP CODE (FOR CO, ILE, OR CERO) | DW LGTH | /// | PROC ID |
|---|---|---|---|---|---|---|---|---|
| (4 BITS) | (2 BITS) | (26 BITS) | (6 BITS) | (4 BITS) | (8 BITS) | (4 BITS) | | (2 BITS) |

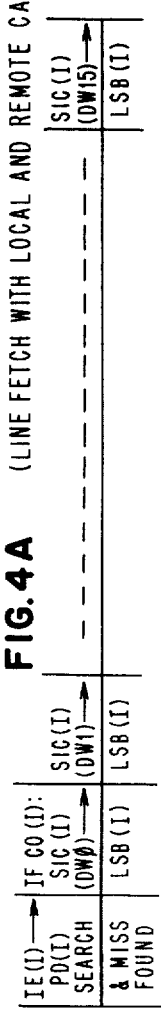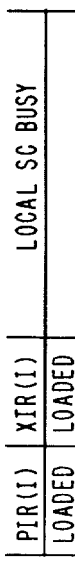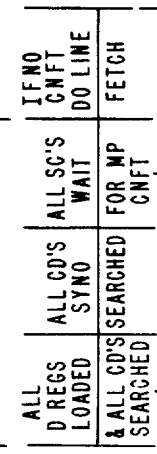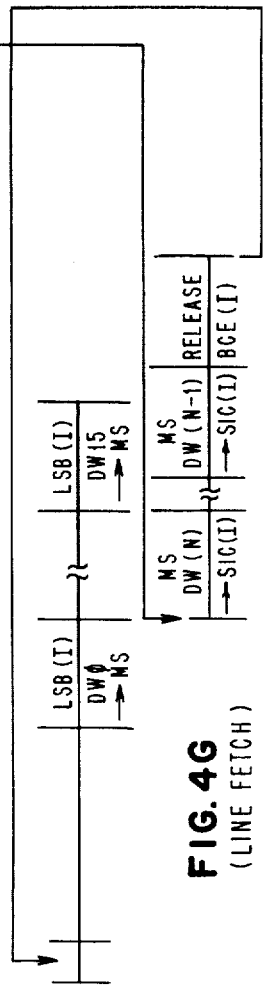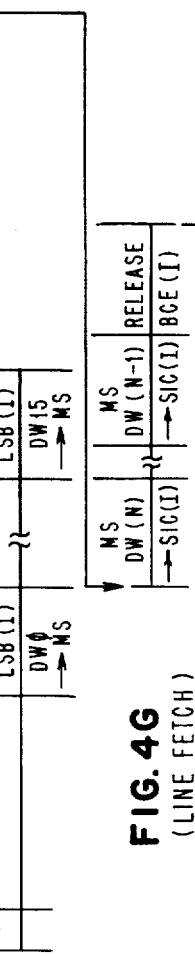

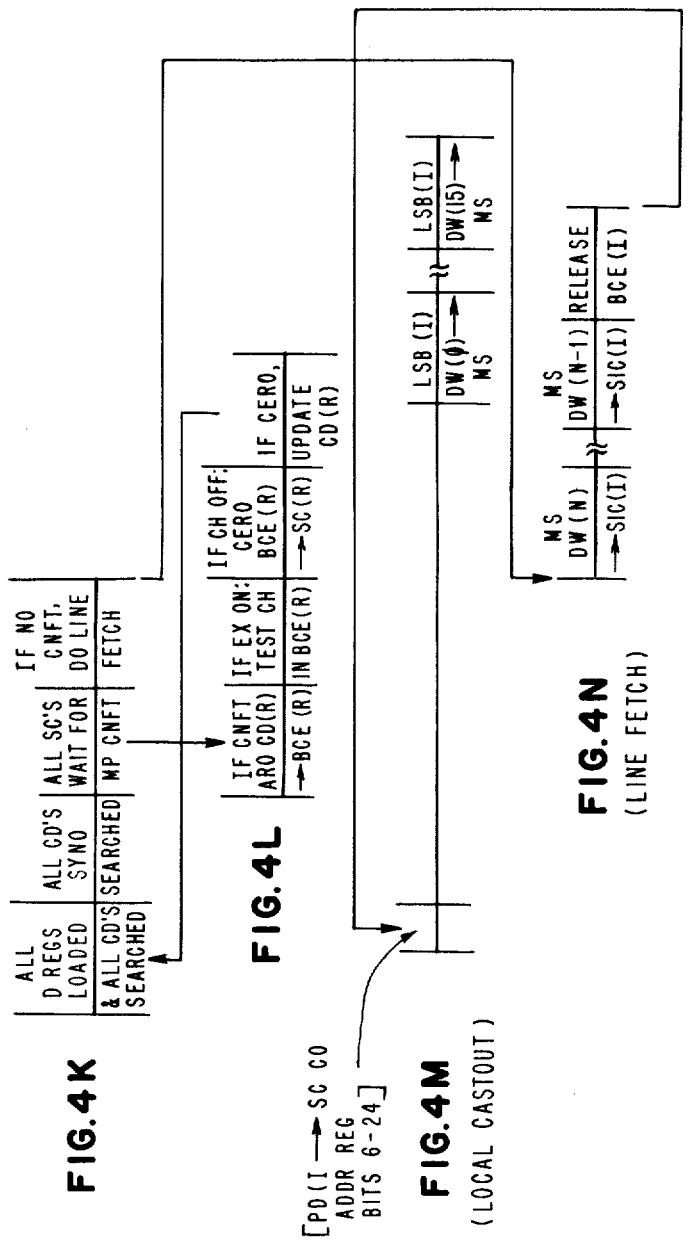

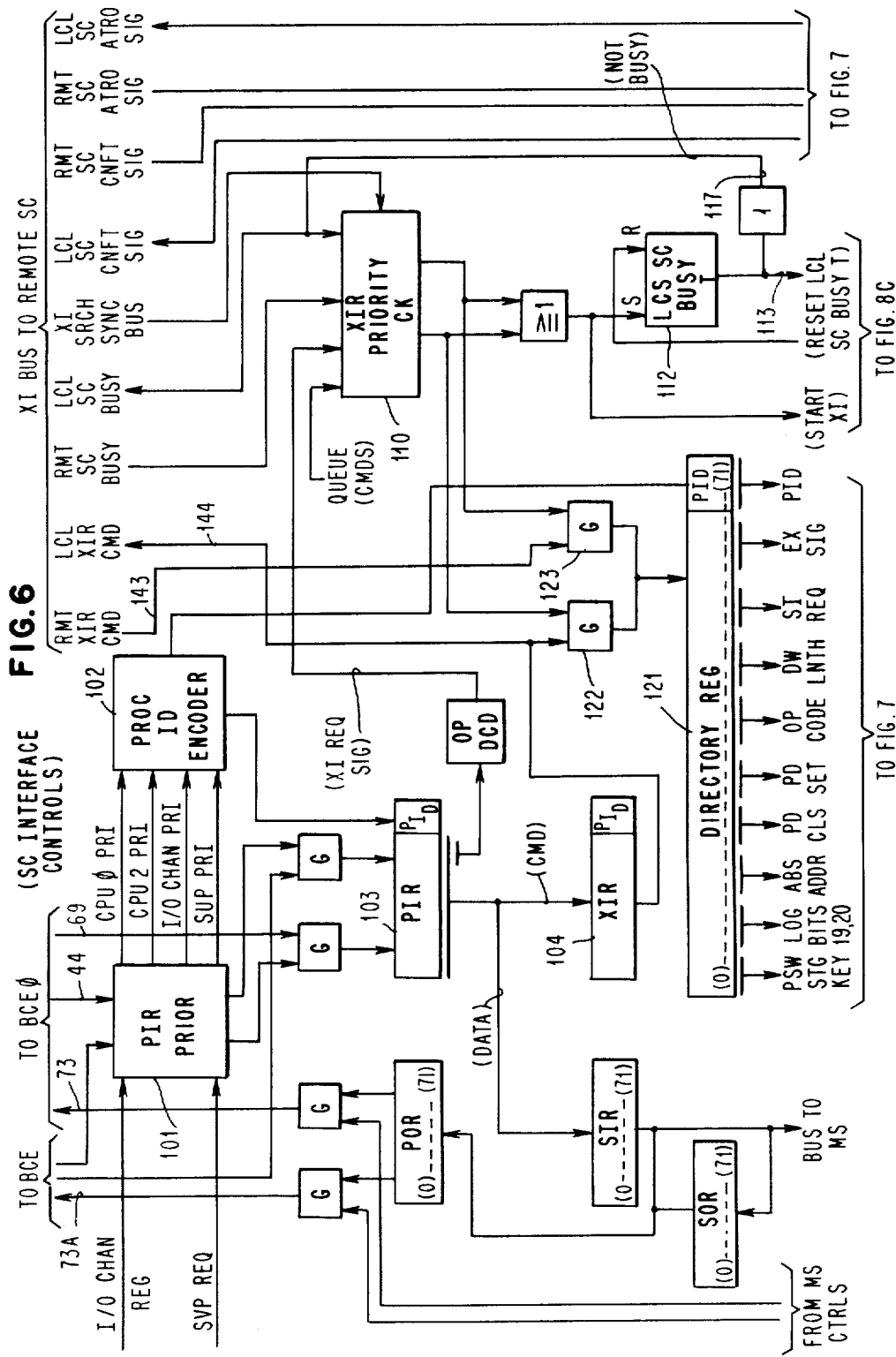

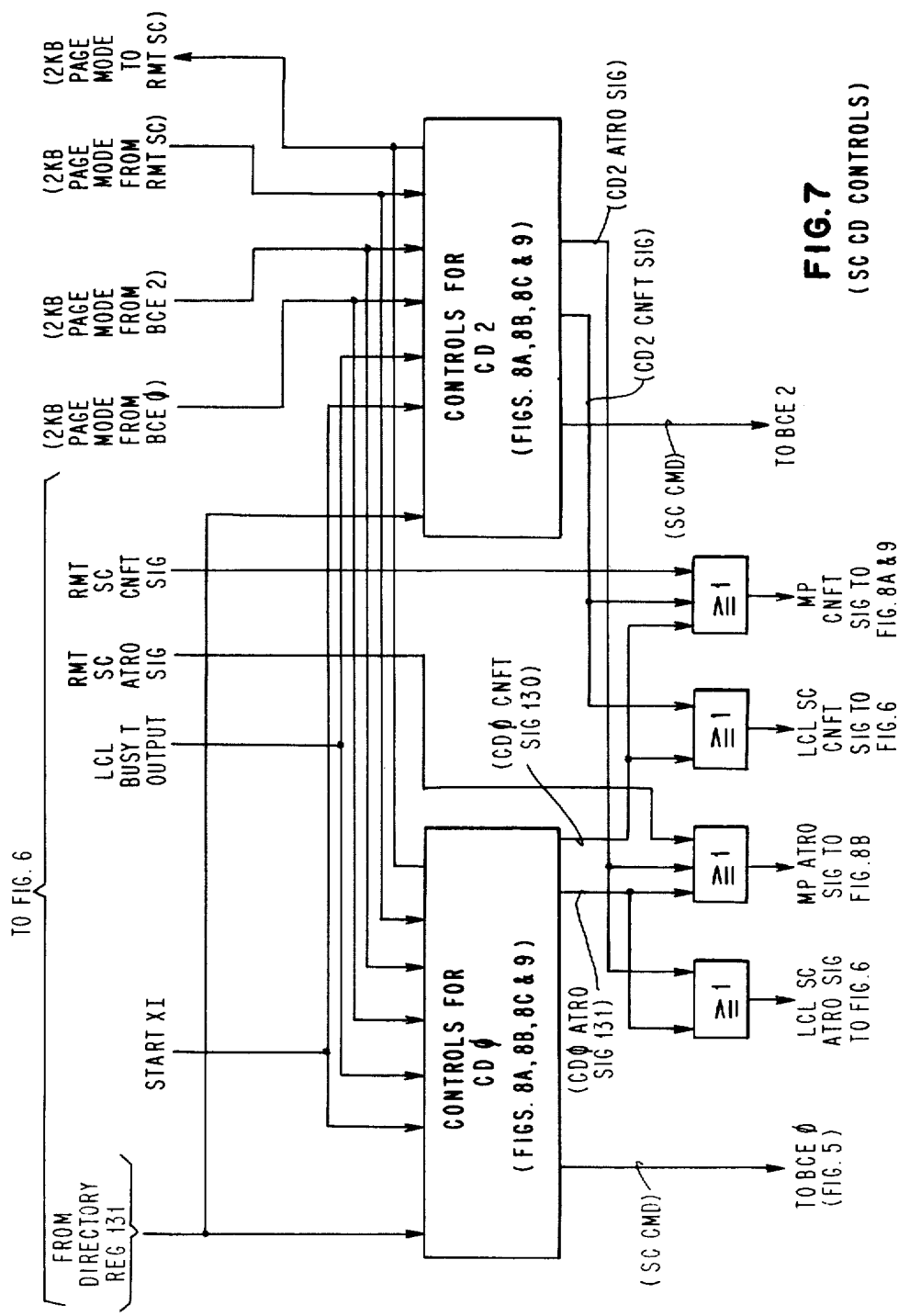

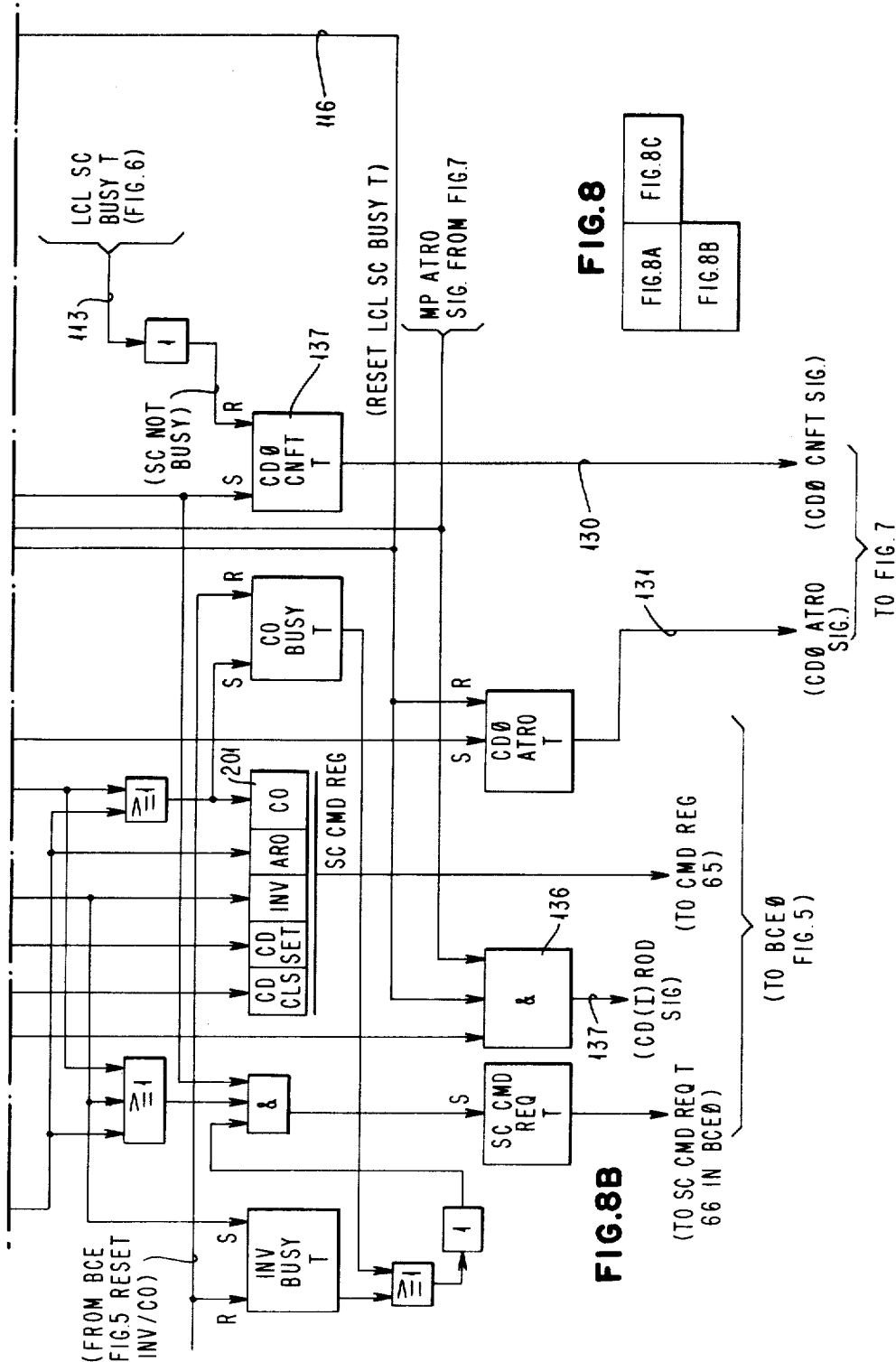

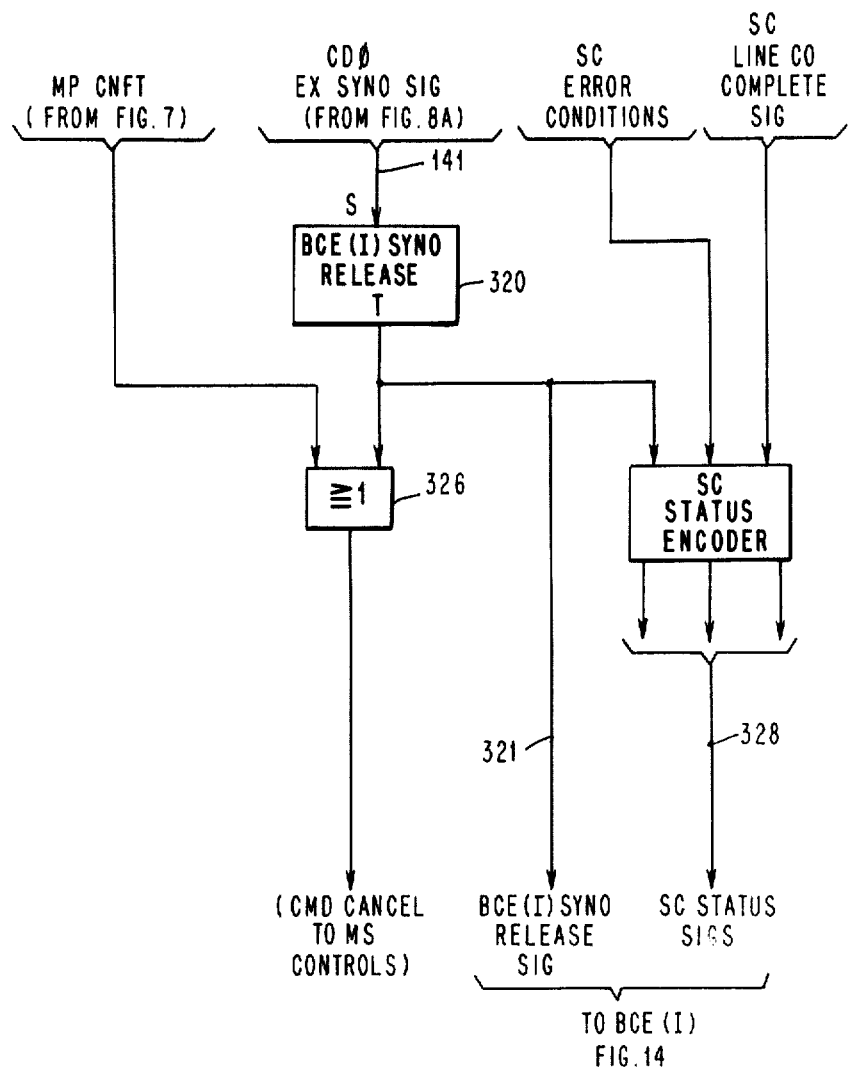
FIG.9 (SC RELEASE AND STATUS CIRCUITS)

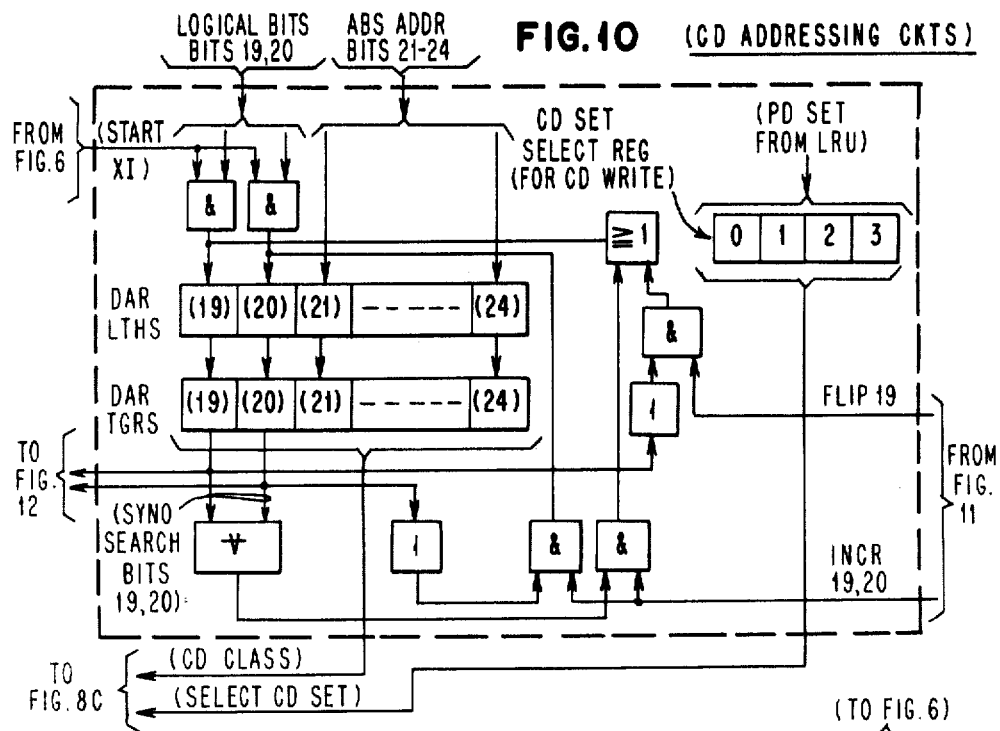
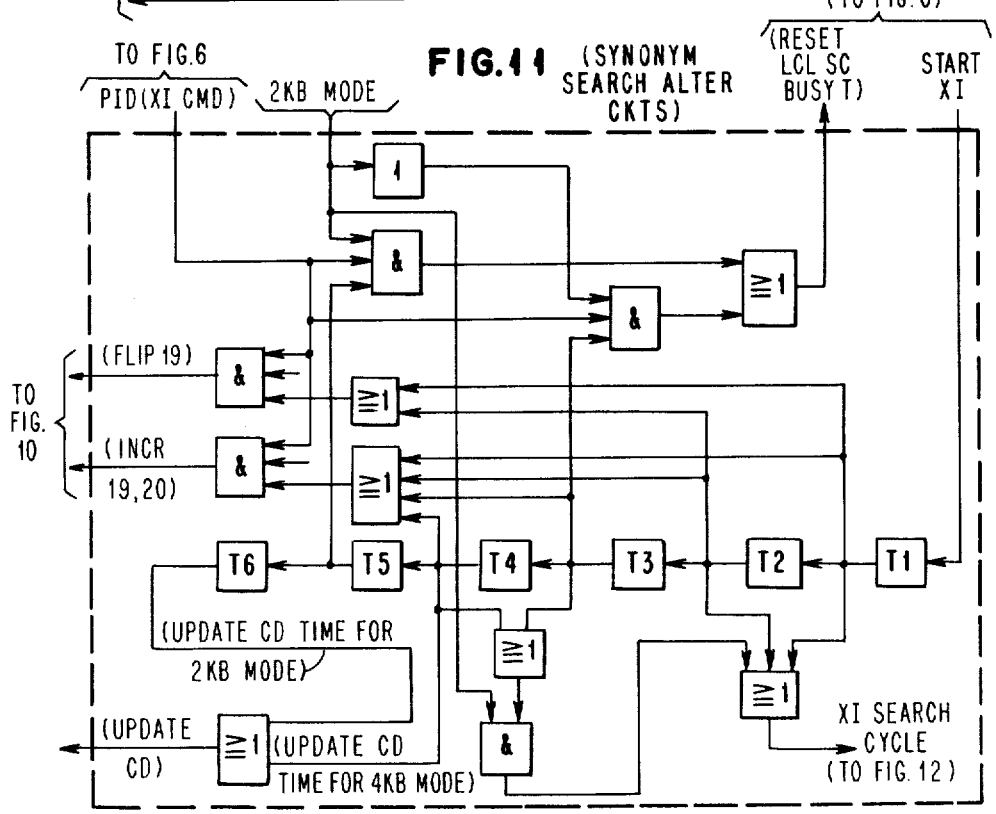

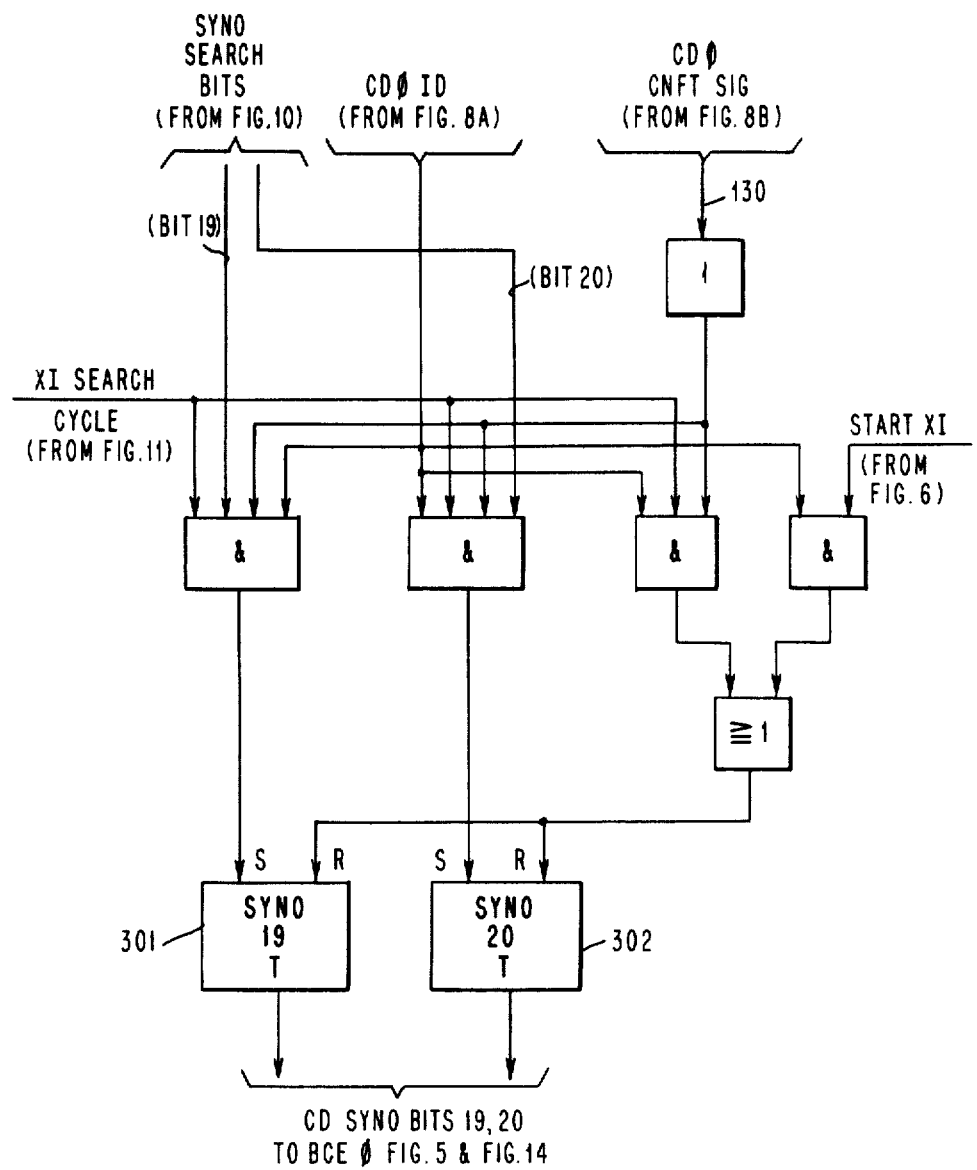
FIG.12 (SYNO CAPTURE CIRCUITS)

(BCE RESPONSE CONTROLS)

(PD CLASS ADDRESSING CONTROL CIRCUITS IN BCE)

FIG. 15 (PD SET INPUT CONTROLS)

FIG.46 (CHANGE BIT TEST CIRCUIT)

FIG. 17 (PD(I) MISS DETECTION CONTROLS)

CACHE STORAGE LINE SHAREABILITY CONTROL FOR A MULTIPROCESSOR SYSTEM

INTRODUCTION

The subject invention relates to improvements in controlling the shareability of lines of data between store-in-caches (SICs) with plural central processing units (CPUs) of a multiprocessor (MP) system in order to increase the performance efficiency of the MP system.

PRIOR ART

Recently the store-in-cache (SIC) has been found to provide better system performance than store through (ST) caches in large multiprocessor (MP) systems because the SIC has less bandwidth requirements to main storage than the ST. A processor having a SIC does not see main storage when it performs a write operation since the processor writes into the SIC, unlike a ST cache processor which writes directly in main storage. Thus, a processor with a SIC can only indirectly cause writes into main storage when cache misses occur, which happen only after the addressed entries in the cache are filled with changed data.

However, MPs using SICs have additional cache problems occurring because the latest version of a data line in a SIC may at any particular time only be found in one processor cache in the MP system and may not be available in the shared main storage (MS). In such case, a processor requiring, but not having the line, has no recourse other than to obtain the line from the other processor cache which contains the latest version. In U.S.A. Pat. Nos. 3,723,976 (Alvarez et al) or 3,771,137 (Barner et al) or 4,056,844 (Izumi), if the requesting processor made a fetch request for the line, it was always castout from and invalidated in the requested processor cache having the line and always implicitly was given exclusively to the requesting processor cache, either directly or through main storage. An MP improvement was obtained by the line shareability invented in U.S.A. Pat. No. 3,735,360 to Anderson et al which disclosed and claimed the fetch only (i.e. readonly) shareability designation provided for each line in each processor SIC directory. The fetch only control eliminated cross-interrogation between plural processor cache directories in an MP in the situation where the plural processors each held the line in fetch only state. Thus, for the first time, U.S. Pat. No. 3,735,360 to Anderson et al enabled parallel as well as serial shareability of lines in plural SICs in an MP. Thus, the novel feature of that patent enables plural processors in the MP simultaneously to have fetch only (i.e. readonly) access to the same line of data in their different caches when their fetch only bit was set to fetch only state, which eliminated cross-interrogation between caches and avoided invalidation, as long as no processor attempted to store into the data line. If any processor not having a line of data requested the fetch of the line when it was held either fetch only or exclusively in another processor cache, the line was then fetched into the requesting cache and was always shared by both processor caches. Regardless of whether the line was changed or not when it was designated not fetch only (i.e. exclusively) in the requested processor cache, the line was castout without invalidation and the line designation was changed to fetch only (i.e. readonly) state in the casting out processor cache.

Castout controls for an MP system having copy directories and command queues in its system controllers is disclosed and claimed in U.S.A. Pat. No. 4,136,386 to Annunziata et al.

SUMMARY OF THE INVENTION

This invention provides an improvement in overall MP system performance by providing an unobvious change in the way data line shareability for a fetch request is controlled by cache conflict determination hardware. More specifically the invention uses the most recently available information about the shareability of a line requested by one CPU which was used by another CPU to more efficiently control the line shareability of a fetch request. The shareability determination is made for a fetch requested data line and can ignore an exclusive request for the line by a CPU for the situations in which: (1) an unchanged version of the line exists in another CPU SIC which holds the line exclusively (i.e. not fetch only), or (2) the requesting CPU requests the line exclusively when the line is held readonly (i.e. fetch only) in another CPU SIC. The subject invention controls how the final shareability designation of the line in the requesting and remote SICs is affected by the changed/nonchanged state of that line in a remote SIC having that line. That is, this invention causes the exclusive or readonly shareability designation for the line in the receiving SIC to be dependent upon whether or not the line was changed in the sending SIC. When an exclusively requested line has been changed in another SIC, the invention does not alter the line's exclusive designation to readonly in the other SIC or designate the line readonly in the requesting SIC (as is done in the prior Anderson et al patent). Instead, with an exclusive fetch request by one CPU for an exclusive line changed in another SIC, the invention casts out and invalidates that line in the other SIC and gives the line exclusively to the requesting SIC. But, if the requested line was not changed in the remote SIC, the invention does not invalidate the requested line even when said exclusively in the other SIC, but only alters its shareability designation from exclusive to readonly in both SICs so that both CPUs can have simultaneous fetch access to the line.

The reason for this unique handling of a line fetch request is based on the discovery (1) that a requested line probably will soon be changed in a requesting SIC if that line was changed in another SIC regardless of whether the CPU request is only for an exclusive or readonly fetch, and (2) that the line probably will not be changed if an exclusive request for the line finds the line unchanged in another SIC regardless of whether it is designated as exclusive or readonly in the other cache. This reduces the line miss overhead by reducing the frequency of line misses in the caches, since processors having simultaneous readonly access to the same line in their caches do not generate line misses by their fetch accessing. But if they each were exclusively given a line in alternate fashion, line misses and their long access time would thereby alternately occur, which is called line thrashing.

In this manner, the invention provides an intra-SIC designation control method and means which substantially reduces the amount of thrashing of lines back and forth between caches to significantly increase the performance of an MP.

In other words, in an MP configuration utilizing a "store in buffer" cache, the improper sharing control of data can produce significant performance degradation. The objective is to bring data and instructions into a processor cache (by line) with a designated exclusive/readonly shareability that controls the serial/parallel access to the line by plural CPUs. This will allow multiple processors to dynamically share lines which are truly readonly (RO) and minimize the disruption (performance loss) due to changes in the (EX/RO) shareability designation and/or invalidation of cache lines. In all cases, data integrity is maintained in that the most up-to-date data is always available to each processor accessing any line.

Lines brought in to a SIC due to instruction fetching are requested with RO shareability because they will probably not be written into, thus allowing multiple processors to simultaneously access the same instructions. Lines referenced to obtain operand data present a different problem. A cache miss due to an operand store request is brought in with EX shareability after the castout of the appropriate line from any other SIC having a changed version of the line. A cache miss due to an operand fetch request is handled as follows:

1. If a line does not exist in any SIC, the line will be fetched from MS and brought into the requesting SIC with EX shareability to permit subsequent stores therein with no disruption to the cache operation.
2. If a line only exists in another SIC due to EX shareability and has been changed, then it is judged probable that the next use of the line in the requesting SIC will also change the data. Then the line is brought into the requesting SIC with the EX designation after a castout of the line from the other SIC.
2. If a line exists in another SIC with EX designation and has not been changed, then it is judged probable that the next use of the line will not change it. Thus, the line is brought into the requesting SIC with RO shareability while leaving the line also in the other SIC with RO shareability.
4. If a line exists in another SIC with RO designation, that it is judged probable that the next use of the line in the requesting SIC will not change it. Thus, the line is brought into the requesting SIC with RO shareability while leaving the line also in the other SIC with RO shareability.
5. If a readonly bit is set on in page table entries in MS, any line fetched from the associated page will only be brought into a requesting SIC with RO shareability, regardless of the type of CPU request used to access the page.

It is therefore a first object of this invention to improve MP system performance by using the state of a change bit for a requested line in any SIC in an MP to control the state of an exclusive/readonly bit for the same line when it is brought into a requesting SIC in response to a CPU fetch request.

It is a second object of this invention to force a requested exclusive shareability designation to a readonly shareability designation when a requested line is found unchanged in another SIC with exclusive shareability so as to enable simultaneous accessing of unchanged data even though one or both CPUs having the data had requested the data exclusively.

It is another object of this invention to obtain the first and second objects of this invention in an environment in which cross-interrogation between caches is performed among copy SIC directories rather than among processor SIC directories, in order to minimize cross-interrogation interference with processor SIC operation.

It is a further object of this invention to obtain the prior stated objects by having for each line in the processor SIC directory (PD) at least a change bit, an exclusive/readonly bit and a valid bit, and by having in each copy SIC directory (CD) at least the copies of the exclusive/readonly bit and the valid bit for each corresponding line.

BRIEF DESCRIPTION OF THE DRAWING

FIG. 1 is a block diagram of a multiprocessing system utilizing the subject invention.

FIGS. 2A and 2B illustrate the tag bits found respectively in the processor directories and copy directories for each line represented therein.

FIGS. 3A, 3B, 3C and 3D illustrate the types of information found in various commands used in the described embodiment of the invention.

FIGS. 4A, 4B, 4C, 4D, 4E, 4F, 4H, 4J, 4K, 4L, 4M and 4N represent timing diagrams showing the sequencing of operations in the described embodiment.

FIG. 6, 7, 8A, 8B, 8C and 9 illustrate the pertinent controls found in each system controller (SC) shown in FIG. 1.

FIG. 10 illustrates in detail the copy directory (CD) addressing circuits shown as a block in FIG. 8C.

FIG. 11 shows in detail the synonym search alter circuits represented as a block in FIG. 8C.

FIG. 12 shows in detail the synonym capture circuits represented as a block in FIG. 8C.

BACKGROUND SYSTEM CONTAINING THE PREFERRED EMBODIMENT

Figure 5:
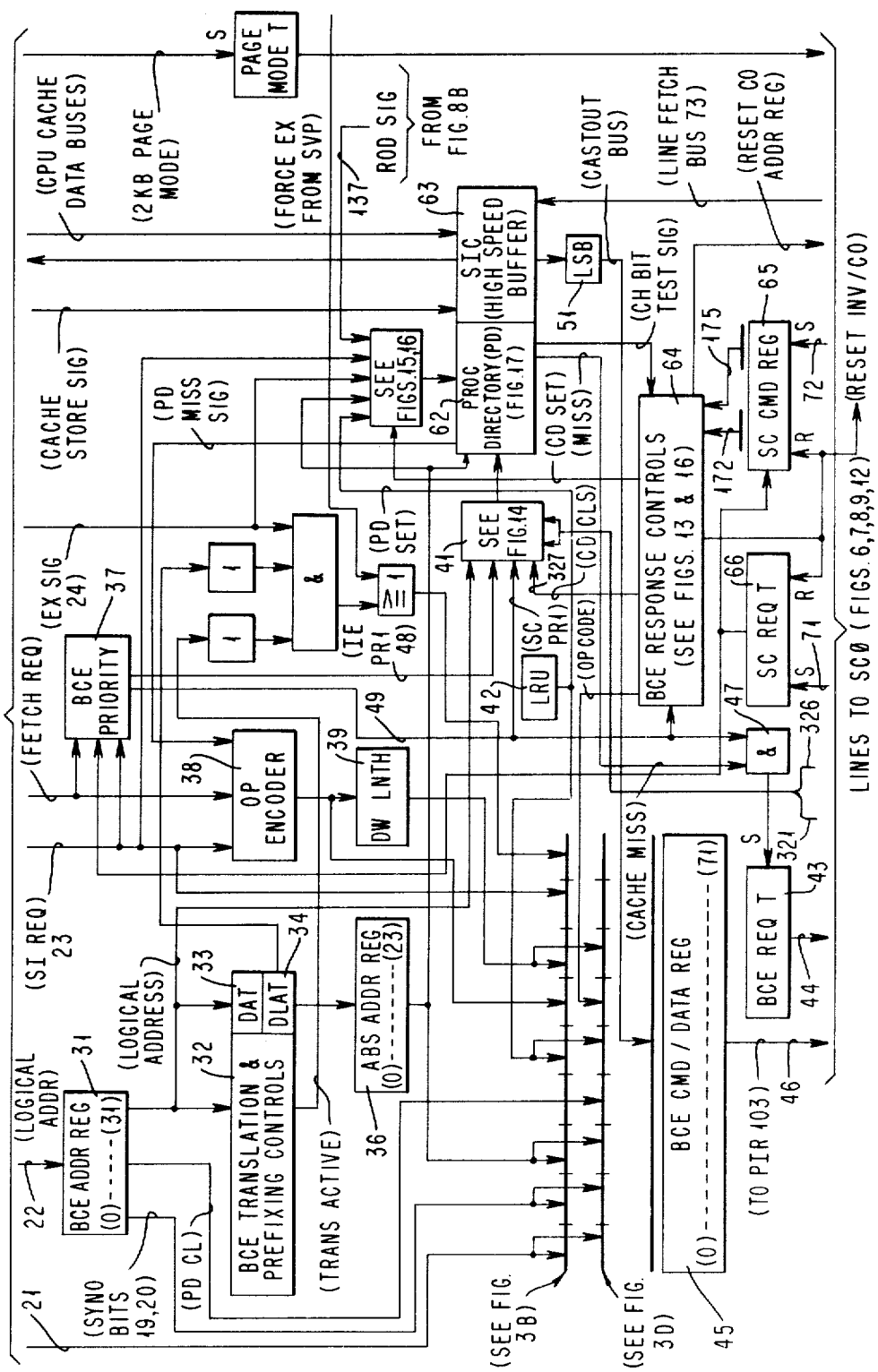
FIG. 5 illustrates the pertinent processor buffer control element (BCE) found in each central processor (CPU) shown in FIG. 1.

FIG. 1 represents a background multiprocessing (MP) system containing the described embodiment of the invention. The MP illustrated in FIG. 1 comprises four central processors CP0 through CP3, in which each CP includes an instruction execution (IE) unit and a buffer control unit (BCE). Each IE includes the hardware and microcode which issue instructions which require the fetching and storing of operands in main storage (MS). The IE begins a fetching or storing operation by issuing a fetch or store command to its cache controls (BCE), which includes a processor store-in-cache (SIC) with its associated processor cache directory (PD) and all processor cache controls which are exclusively used by the associated CP. The CP generally issues a fetch or store command for each doubleword (DW) unit required by an operand. If the DW is in the PD (as is the case with most processor fetch and store commands), the DW is fetched or stored in the cache in accordance with the command, and the command is completed without any need to go outside of the BCE. Occasionally the required DW is not in the cache, which results in a cache miss. Before the IE fetch or store command can be completed, the DW must be fetched from MS. To do this, the BCE generates a corresponding fetch or store miss command which requests an associated system controller (SC) to obtain from MS a line unit of data having the DW required by the IE. The line unit will be located in MS on a line boundary, but the required DW will be the first DW in the fetched line to be returned to the requesting BCE.

In the MP in FIG. 1, two system controllers SC0 and SC1 are each connected to two CPs and to the shared main storage (MS), so that either connected processor can access any shared area in main storage. Each SC also connects I/O to the shared main storage. Each SC may include the subject matter disclosed in U.S. issued patent applications-U.S.A. Pat. No. 4,280,176; issued: July 21, 1981; Ser. No.: 973,466; filed: Dec. 26, 1978 by K. G. Tan entitled "Memory Configuration, Address Interleaving, Relocation and Access Control System" and U.S.A. Pat. No. 4,293,910; issued: Oct. 6, 1981; Ser. No. 054,350; filed: July 2, 1979 by F. O. Flusche et al entitled "Reconfigurable Key-In-Storage Means For Protecting Interleaved Main Storage", both assigned to the same assignee as the subject invention.

The shared main storage comprises of a plurality of BSM controllers BSC0 through BSC3 in which each BSC connects to two BSMs 0 and 1. The four BSCs 0-3 are each connected to each SC.

A cross-interrogate (XI) bus connects from each SC to the other SC. The XI bus communicates all cross-interrogation (XI) requests and all castout (CO) and invalidate (INV) signals between the SCs to synchronize and coordinate the required castouts, MS fetches, and invalidations in the directories.

Each SC contains a pair of copy directories. Each copy directory (CD) contains an image of the contents of a corresponding processor cache directory (PD) in one of the BCEs connected to the respective SC. Both PD and Cd are addressed by the same bit positions from the logical address.

The copy directories handle all cross-interrogation (XI) requests, so that the processor cache directories in the various BCEs will not need to handle the XI interrogation requests and can thereby better service their respective CPs. The XI bus connects all SCs and synchronizes all CD searches for conflicts so that XI searching is avoided in the PDs.

Each of the other CPs 1-3 has an IE identical to the IE0. Each IE unit is basically similar to IE units found in conventional microprogrammed processors.

A doubleword wide bidirectional bus is provided between each BSM in main storage (MS) and each SC port, and from each SC to each associated central processor (CPU) and I/O channel controller (EXDC) processor. Both commands and data may be sent on any bus. When a CPU cannot find a requested doubleword (DW) in its cache, its buffer control element (BCE), which controls the CPU cache, initiates a line access request to MS by sending a miss command to its associated system controller (SC), which then reissues the command to a required BSM in main storage. In the event of a BSM busy condition, the SC will save the request in a command queue and will reissue it at a later time when the required BSM becomes available. The SC also sequences the MS commands in an orderly fashion, so that all commands to a particular BSM are issued in first-in/first-out (FIFO) order, except when a cache conflict is found. Prior to issuing a MS line command, a real address to physical address transformation is performed by the SC to determine the BSM location of the real address. See U.S.A. issued Pat. No. 4,280,176 Ser. No. 973,466 filed Dec. 26, 1978 by K. G. Tan. At the same time, the request is sent to the storage key array to check for a possible access storage protection violation, as well as to the copy directories in all SCs to search for a possible data contention conflict. Thus, during the normal sequence of handling a MS request, the SC is constantly monitoring the status of main storage, is analyzing the interrogation results of the storage protect key and all cache directories, is examining the updated status of all pending commands currently being held in the SC, and is also looking for any new BCE commands that may be waiting in the BCE to be received by the SC.

The main storage protect key arrays are located in the system controller as described and claimed in U.S.A. Pat. No. 4,293,910 Ser. No. 054,350 filed July 2, 1979 to F. O. Flusche et al, assigned to the same assignee as the subject application. It performs all key operations defined by the IBM System/370 architecture. Normally, the storage key is checked in parallel with the issuance of the request to memory and this check does not interfere with actual main storage access time.

Due to the store-in-cache (SIC) design of each CP cache, CP changed data resides in the CP SIC and is not available in MS until the data is castout of the SIC by the cache line replacement mechanism whenever cache line space is required for newly requested lines. Each SIC has a processor cache directory (PD) which controls its SIC operations.

GENERAL DESCRIPTION OF THE DETAILED EMBODIMENT

Because of the nature of a CPU store-in-cache (SIC), each CPs updated lines in its SIC are not stored in MS immediately. Thus, many lines of shareable, unchanged and changed data may be scattered among the SICs. Unchanged SIC lines are available in MS, but changed lines are only available in the SIC in which they reside. Each SIC line is given a shareability designation, which is used by the MP cache management controls to apply appropriate control over the type of shareability of each line while in one or more SICs in the MP. In general, any IE request instructions with the parallel shareability designation of readonly, because instructions are not expected to be changed. However, operand data are generally requested by the IE with the serial shareability designation of exclusive, because they are to be changed, or are likely to be changed. The IE shareability designation is provided in FIG. 5 on line 24, on which an up signal state indicates an exclusive (EX) designation for the current IE request, while a down signal state indicates a readonly (RO) designation for the current IE request to the BCE in the CP.

Although a CP request may be for a doubleword (DW), unit for the CP, it is accessed from a line unit of operand data and/or instructions in its cache. Main storage accessing efficiency is greatly improved by having line units of plural DWs (e.g. 16 DWs) accessed as a unit in MS for each cache, and each cache directory is organized to manage its content on a line basis. Therefore, the shareability designation in the cache is done on a line unit and not on a DW unit basis.

The line shareability designation is checked for each CP DW unit access in the cache and any IE store request causes a cache miss when the shareability designation for the accessed line is RO; but any IE fetch request is immediately accessed. If the line designation is EX, both IE fetch and IE store requests are immediately accessed into the line in the cache.

Therefore, when any IE initiates an operand or instruction fetch request, the IE issues a fetch command such as shown in FIG. 3A for a doubleword (DW) of data or instructions to its BCE with one of the following two types of sharing control designations:

Readonly (RO): The DWs in the line in the cache may immediately be fetched. All CPs can simultaneously access the line in their processor SICs as long as they need only fetch the data in the line. Any CP store request for a DW in a line designated RO causes a cache miss which changes the designation to EX and forces any other CP sharing the line RO to invalidate its copy of the line.

Exclusive (EX): The DWs in the line may be fetched or stored into by the CP processing the line exclusively. No other CP can access the line. If another CP must access the line, the CP possessing the line must give up the line to the CP requesting the line which then becomes the only CP possessing the line. If the possessing CP has stored into the line (i.e. changed it) the possessing CP has the latest version of the line; and the line version in MS is not the latest version and should not be accessed. Therefore, the possessing CP must castout a changed line to MS to provide the latest version in MS whenever another CP is to obtain the line, whether or not the possessing CP will continue to possess the line with a readonly designation.

This invention controls when a line designation can be changed from exclusive to readonly to enable parallel shareability in spite of IE requests for exclusivity.

Therefore, the current line shareability designations in each SIC in the MP are contained in the processor directory (PD) associated with each SIC in the MP. The BCE containing each PD enforces the rules pertaining to the shareability designations in the PD, and generates a cache miss for the current IE request whenever the requested PD class does not contain an entry with the translated request address. A request in a synonym entry will cause a cache miss. Inter CP communication is required for servicing each cache miss.

The implementation of these shareability rules is complicated by having copy directories (CDs) control the inter-CP communication of CP requests, but the CDs are needed to reduce interference with normal SIC operation due to inter-CP communications.

The nomenclature used herein distinguishes the issuing CP (which may be any CP0–CP3 in the MP issuing a storage request command being XIed) from each of the remote CPs (which is the remaining CPs of CP0–CP3 that did not issue the command for which they are being XIed). The issuing CP and all of its associated cache entities (i.e. its IE, BCE, PD, SIC and CD) are identified with the suffix (I), i.e. IE(I), BCE(I), PD(I), SIC(I) and CD(I). Every remote CP and all of its cache entities are identified with the suffix (R), i.e. IE(R), BCE(R), PD(R), SIC(R) and CD(R).

A cache miss signal occurs if a CP(I) requested DW is not identified in its PD(I), i.e., not in PD(I) or in a synonym entry in PD(I), or is identified with a RO designation when the CP(I) is requesting a storage write access. In response to any cache miss signal the CP(I) cache controls in its BCE(I) request a cross-interrogation (XI) of its directory CD(I) to check for synonyms and of all other directories in the MP to check for conflicts to assure that the requesting SIC(I) will receive the latest version of that line, or for a store request to invalidate the requested line when it is held RO in any SIC(R). The XI operation searches the copy directories CDs of all CPs to determine if any remote CP cache has the line (i.e. a cache conflict).

When virtual address bits are used to address the cache directories, they cause potential synonym locations in each directory which must be searched for the absolute address of the CP request.

Cross-interrogation searching is not done in the PD(R)s so that no PD(R) cycles are stolen for XI purposes, and therefore the XI burden is placed on the CD(R)s. The PD(R) is only accessed as a result of a XI search of a CD(R) only when the PD(R) must be changed. Most XI searches will not cause any change in the associated PD(R), since only a small percentage of XIs will find any conflict (e.g. less than 5%).

Thus, if cross-interrogation for a CP fetch request finds the line in another CD(R) (i.e. a line conflict), its shareability designation is checked in the remote CD(R). If an RO designation is found, no further action is required for the other CD(R). But if an EX designation is found for the conflicting line, the SC controls for that conflicting CD(R) must generate an ARO (alter to readonly) command to its corresponding PD(R). Then the BCE(R) with the corresponding PD(R) tests the state of a line change (CH) tag bit in combination with the EX state to determine the final designation for the conflicting line subject to the fetch request. If the CH bit indicates no change, PD(R) changes the EX bit to RO state and issues a CERO (change entry to readonly) command to its associated CD(R) to do likewise. But, if the CH bit indicates the line was changed, the BCE sets the V (valid) bit to invalidate state in the PD(R), initiates a castout (CO) of the line from the associated SIC, and issues a castout (CO) command to the SC which causes the conflicting entry in the corresponding CD(R) to have the V bit set to invalidate state.

A CP(I) store interrogate (SI) command initiated the XI. If a conflicting line is found in any CD(R), the SC having the conflicting CD(R) issues an invalidate (INV) command to its associated PD(R) to invalidate the conflicting line when a readonly conflict is detected. If an exclusive conflict is detected, a CD command is issued which causes the PD(R) to test its CH bit, and to issue an ILE command to the CD(R) if the line is held RO or EX and was not changed, but to issue a CO command to the CD(R) if the line is held exclusive and was changed.

IF an I/O channel or service processor (SVP) initiated a fetch or store request to main storage, each CD(R) must be cross-interrogated for the address of the request to determine if its SIC has conflicting data. If a conflict is found in a CD(R) holding the data exclusively or holding it RO when there is an I/O or SVP store or fetch request, the CD(R) communicates with its PD(R) and the line is invalidated if unchanged, or castout and invalidated if changed.

All possible request types, initial and final line shareability designations, pertinent commands between each associated CD and PD pair for a CPU having a conflicting line, and the effect of the CH bit in the PD are summarized in the following Table 1:

TABLE 1

| ISSUING CP(I) (With Cache Miss) | | | | REMOTE CP(R) (With Conflict) | | | |
|---|---|---|---|---|---|---|---|
| | | | | SC | BCE(R) CMD to SC(R) | | CD(R) |
| Request Type | New Line Desig. | Old Line Desig. Initial | Old Line Desig. Final | CMD to BCE | data changed (CH ON) | data unchanged (CH OFF) | to CD(I) SIG |
| CPU Read Only (RO) Fetch | RO RO RO | RO EX EX | RO INVAL RO | — ARO ARO | — CO & ILE — | — — CERO | — — — |
| CPU Exclusive (EX) Fetch | RO EX RO | RO EX EX | RO INVAL RO | — ARO ARO | — CO & ILE — | — — CERO | ATRO — ATRO |
| CPU Store Interrogate (SI) | EX EX EX | RO EX EX | INVAL INVAL INVAL | INV CO CO | — CO & ILE — | ILE — ILE | |
| I/O or SVP Fetch | | RO EX EX | RO INVAL INVAL | — CO CO | — CO & ILE — | — — ILE | |
| I/O or SVP Store | | RO EX EX | INVAL INVAL INVAL | INV CO CO | — CO & ILE — | ILE — ILE | |

Invalidate Line Entry (ILE): BCE(R) sends an ILE command to the CD(R) controls to invalidate the specified directory line entry in the CD(R).

Cast Out (CO): BCE(R) transfers the line having the request address from SIC(R) to MS through a line store buffer (LSB) in BCE(R), which causes the CD(R) entry to be invalidated upon the successful completion of the store operation.

Alter to Readonly (ARO): SC command asking BCE(R) to test the CH bit in PD(R) and make an appropriate command to CD(R), i.e. a CERO or CO command.

Change Entry to Readonly (CERO): BCE(R) command asking SC(R) to change the EX bit in CD(R) to its RO state.

Alter to Readonly (ATRO): SC control signal from CD(R) to CD(I) to alter EX bit in issuing PD(I) to RO state.

To assure the integrity of the XI operation, all copy directories in the MP are searched simultaneously. Therefore all CDs in the MP are examined for a line address which matches the line address in each CPU miss request in the MP. Each CD search operation also detects the presence of any match in all synonym locations for the requested line in every CD. If no CD match is found during the search operation, the line fetch request due to the cache miss is immediately accessed in MS. If a match is detected for a synonym in CD(I), the line fetch request is cancelled and the IE access is made in the synonym location in SIC(I). If a match is detected for either the request address or a synonym in CD(R), a conflict signal is provided to CD(I), and any required castout(s) are made from SIC(I) and/or SIC(R) to MS before the line fetch is made to SIC(I). That is, any request with a conflict is held in an SC command queue and is reissued to MS after the castout line is completely stored in MS. The command queues and their SC controls are described and claimed in U.S.A. Pat. No. 4,136,386 filed Oct. 6, 1977 to E. J. Annunziata owned by the same assignee as the subject application.

The SC connects between MS and the BCEs and the I/O channels by using 72 line bidirectional busses (64 data/command lines plus 8 ECC lines) to provide a doubleword parallel transfer for both the commands are transmitted.

DESCRIPTION OF THE DETAILED EMBODIMENT

The pertinent control circuits in each BCE are shown in FIGS. 5, 13, 14, 15, 16 and 17. The pertinent control circuits in each system controller (SC) are shown in FIGS. 6, 7, 8A, 8B, 9, 10, 11 and 12.

Whenever any central processor (CP) must either fetch or store a doubleword (DW) of data, the instruction element (IE) in the CP issues an IE command to the buffer control element (BCE) in the CP shown in FIG. 5. The information in the IE command pertinent to the subject invention is shown in FIG. 3A which includes a storage protection key, the logical address of the request, the type of request (i.e. whether it is a fetch request or a store interrogate (SI) request), and whether the data is being requested exclusively (EX) by the CP so that it can store into the data or whether the data is requested non-exclusively (i.e. readonly so that it may be shared among a plurality of processors, none of which is presumed to write into the requested data). The SI request indicates that an IE store cache command will subsequently occur when the housekeeping (e.g. translation and/or line fetch) is completed as a result of the SI request. The subsequent IE store command contains a store cache signal, after which time the IE provides the data on the bus to be stored in the cache for that address.

Approximately 95% of the IE fetch and store requests are fully satisfied by accessing the SIC, because the data required by the command is already available in the SIC. For the remaining small percentage of the requests which miss in the cache, the request cannot be satisfied until that line of data containing the request doubleword address is fetched from MS into the SIC of the requesting processor. Before the line fetch can be made, some important housekeeping functions must be performed. The first is to assure that there is room in the requesting SIC for the requested line. If there is no room, then the least-recently used (LRU) algorithm circuit must specify which one of four set locations in the addressed directory class is to receive the line address to be fetched, and if any changed data exists in a currently valid line address in that location, that line must be castout to MS to make space in the SIC before the new line can be loaded into the SIC. Also, before the new line can be fetched from main storage, there must be assurance that main storage has the most recently updated version of the new line. This update test is made by cross-interrogating (XI) all CDs in the MP to determine that no other SIC has a changed version of the line. An updated line possibility is indicated when any CD(R) is found to have a conflicting line; and an updated line is confirmed if a change (CH) bit in the associated processor directory PD(R) is in a set state.

An IE command to the BCE (FIG. 3A) may contain the logical address (i.e. virtual or real address) for a DW of instruction or operand data. In the BCE circuits of FIG. 5, an activated SI request bit or fetch request bit in the IE command inputs to a BCE priority circuit 37 to formalize the IE request to the BCE(I). An output of circuit 37 indicates when the BCE(I) accepts the IE command.

In the BCE controls shown in FIG. 5, the logical address is received from the IE command by a BCE address register 31 and is provided to conventional translation and prefixing controls 32, which provide the absolute address, which most of the time may be immediately obtained from a DLAT (dynamic look-aside address translation) array 34. If not in the DLAT, then DAT (dynamic address translation) hardware 33 is invoked to translate the address and place the translation in an entry in DLAT 34. The translated absolute address of the request is put into an absolute address register 36.

Figure 17:
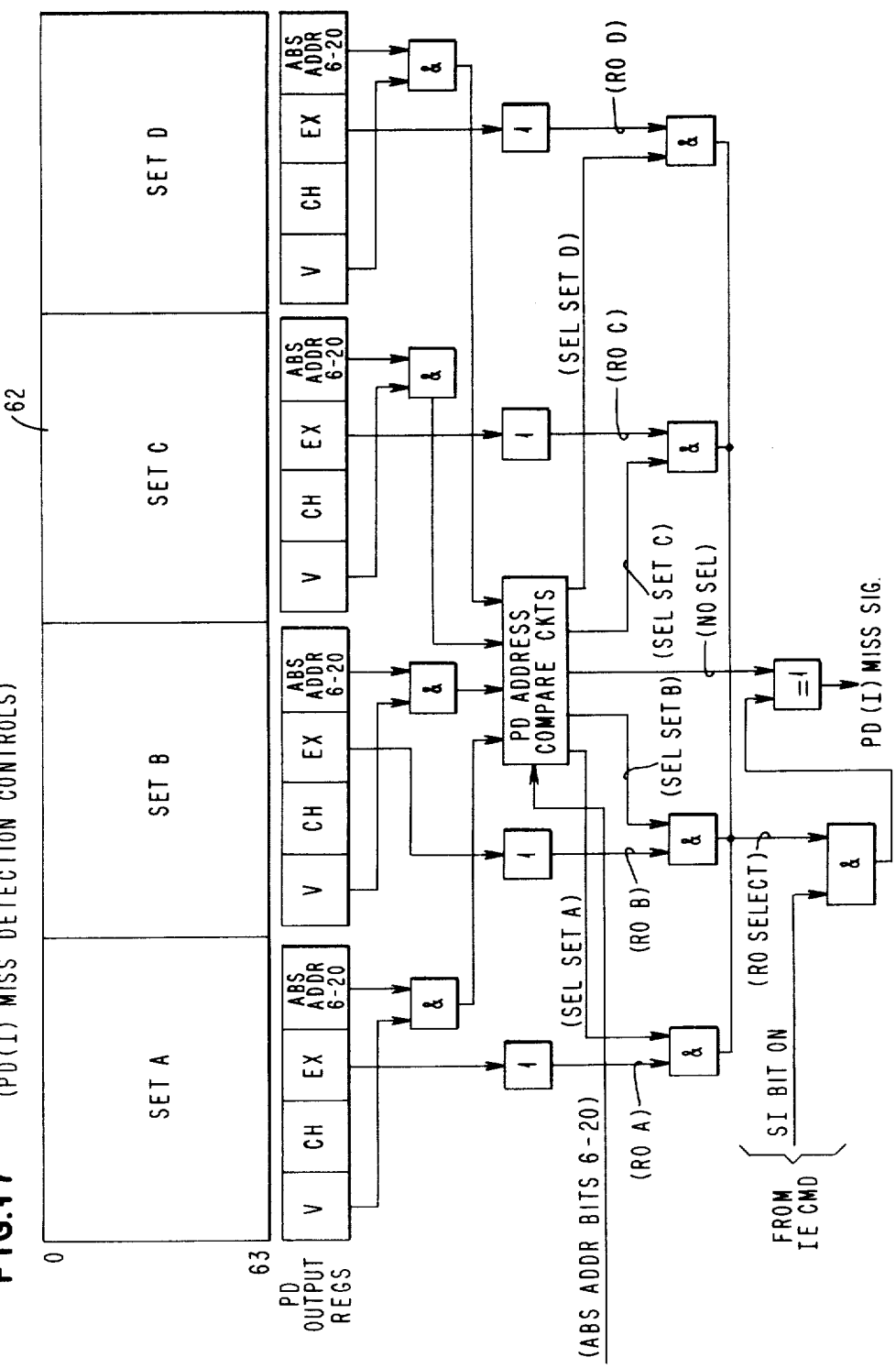
FIG. 17 shows cache miss detection circuits which are provided at the output of the processor directory shown in FIG. 5.
Figure 18:
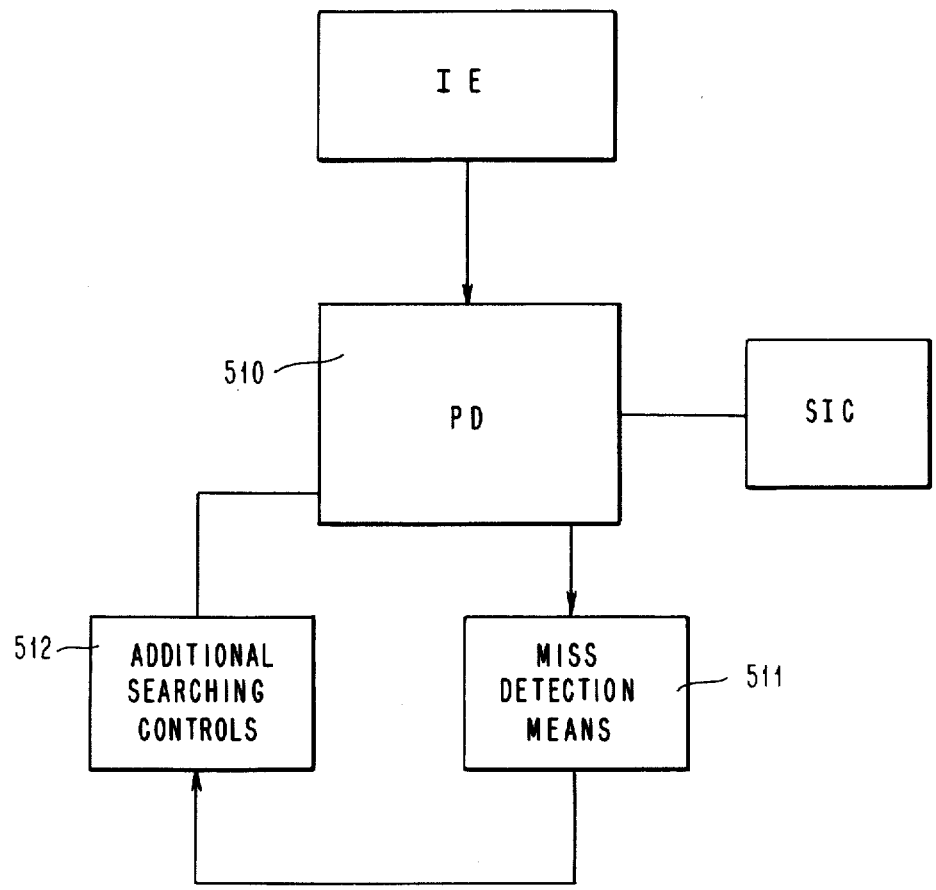

Simultaneously with the DLAT operation, the BCE address register 31 outputs six bit positions 19–24 of the logical address as a class address to PD class addressing controls 41 to select a PD class entry in PD 62 containing four set-associative line entries. The choice of bits 19–24 selects one of 64 classes in the cache. The output of absolute address register 36 is then provided to conventional set-associative comparators in PD 62 to select any line entry in the selected class that matches the absolute address. FIG. 17 shows this comparator circuitry in detail. If no match is obtained, a no select output is activated which provides a cache miss signal. If a match is obtained, data exists in SIC 63 at a line location associated with the matched entry in PD, and the requested DW is accessed in this line.

If a cache miss occurs, it activates an LRU circuit 42 to choose the least recently used entry (i.e. set A, B, C or D) in the same PD class for receiving the tags for the line to be fetched from MS. If the valid bit is off in the selected line entry, or if the valid bit is on and the CH bit is off in this entry, it is immediately available for the new line. If the valid bit is on and the CH bit is on, then an updated line currently resides in this entry and it must be castout before the new line can be received by the SIC 63.

Whenever a cache miss occurs, a BCE miss command is generated in the BCE and sent to the SC in order to make a request to MS for the line to be fetched, and to initiate the XI operations. The miss command is formed in BCE command/data register 45 which receives the absolute address of the requested data from register 31. The BCE command also receives the PD set field from LRU 42, an OP code field from OP encoder 38 which encodes the fetch or store interrogate bit in the IE command, a length field from a DW length circuit 39 which indicates the number of doublewords in a line to be fetched or stored, a SI bit field which indicates whether or not the miss command is a result of a store or fetch command from the IE, and an EX signal field which indicates whether or not the IE requested the data exclusively or readonly. The processor ID field is not transmitted by the BCE but is inserted by the SC when it receives the command, in order for the XI operation to identify the processor from which the command was received, since the XI operations use commands from a number of different processors including one or more CPs, an I/O processor and a service processor.

A BCE request trigger 43 is set by an AND circuit 47 which receives a signal from the BCE priority circuit 37 after it accepts the IE command and a miss occurs.

A PIR priority circuit 101 in the SC (see FIG. 6) determines when the SC accepts a BCE command, and gates it into PIR 103 in the SC. A processor identifier (PID) encoder circuit 102 encodes the PID of the processor which had its command accepted by circuit 101, and inserts the PID into the command in PIR 103. An XIR register 104 receives the command from PIR 103 during the next machine cycle.

An XIR priority circuit 110 determines when the command in XIR 104 will be gated into a directory register 121 via a gate 122, from which the command signals initiate an XI operation by being provided to FIG. 7 representing the controls in one SC containing CD0 and CD2. If another SC exists having CD1 and CD3, it will simultaneously receive these signals from XIR 104 on the XI bus 19. This initiates a simultaneous search of all copy directories in all SCs (whether the MP has only a single SC or plural SCs). The XI search sync lines 111 in bus 119 connect between plural SCs to synchronize all CD searches in the same machine cycles. The search is for the absolute address of the line currently in each directory register 121.

Figure 8A:
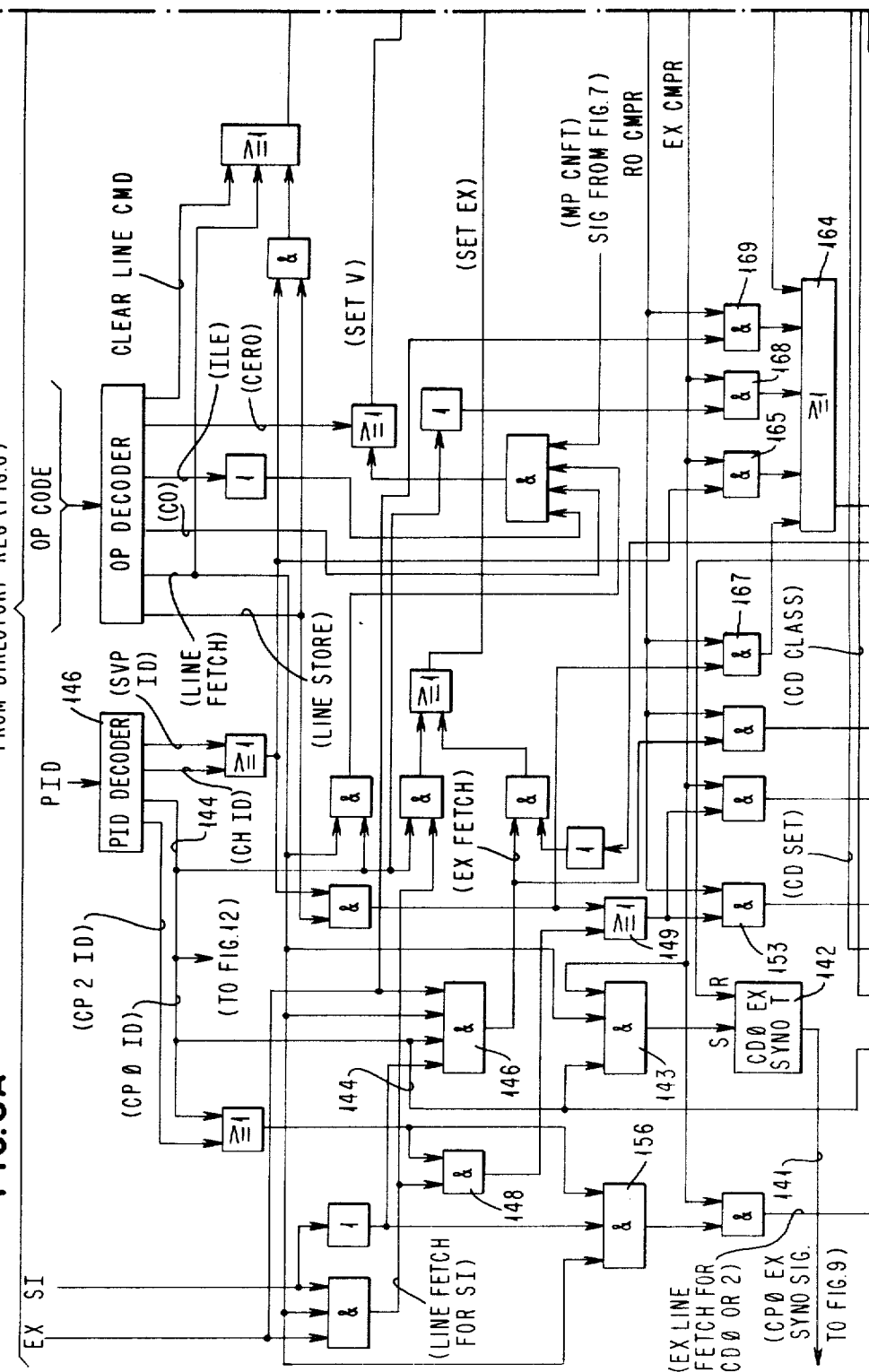
Figure 8C:
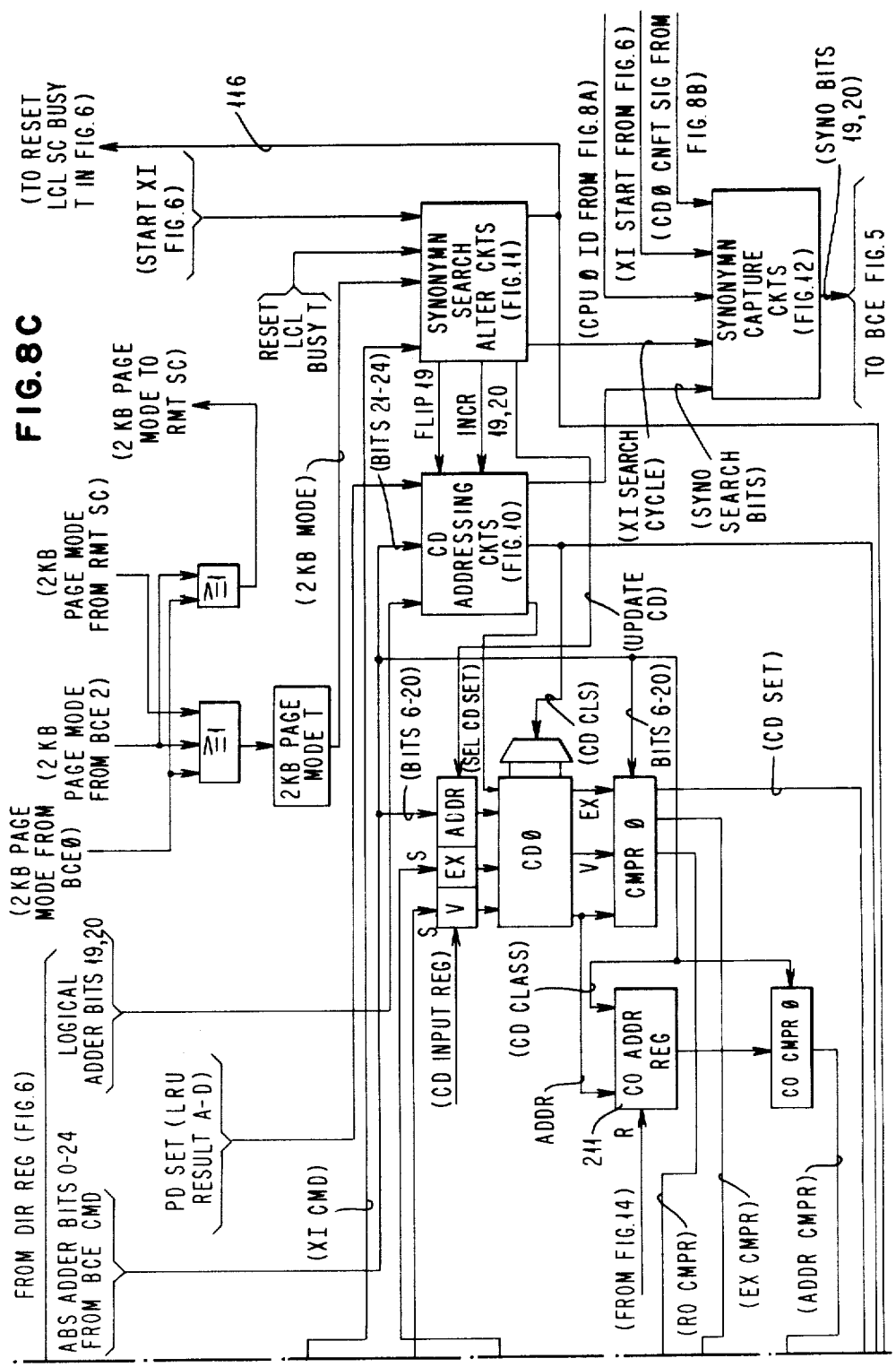
Figure 13:
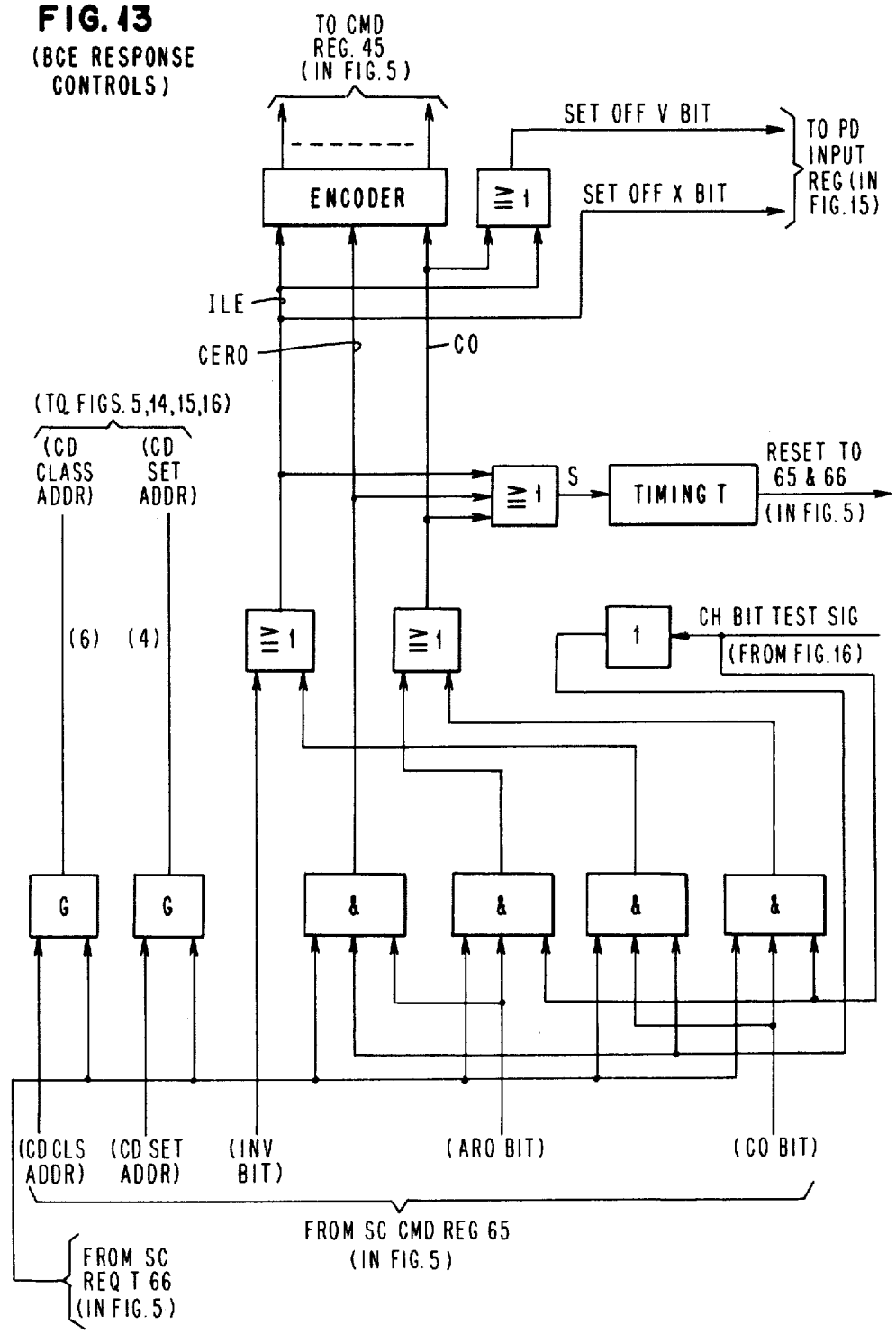
FIG. 13 illustrates in detail the BCE response controls shown in a block in FIG. 5.

Whenever activated, an output of circuit 110 sets a local SC busy trigger 112. If any CD finds the searched address, it generates a conflict signal on line 130 for CD0 in FIG. 8B (or a corresponding line 130 for any other CD). FIGS. 8A, 8B and 8C show SC circuits for generating the CD0 conflict signal 130 from a CD0 conflict trigger 137.

Normally, a conflict can only be found in a remote CD(R). CD(I) finds a conflict when a readonly match is detected in a synonym class.

Although each CD has an entry for every line found in its corresponding PD, the CD need not have all of the information found in its corresponding PD. This embodiment only requires that each CD have the tag information shown in FIG. 2B which includes the valid (V) and exclusive (EX) bits and high-order absolute address bits 8–20 for each represented line. The tag entries found in each PD line entry are shown in FIG. 2A. Each PD line entry additionally contains a protect key, a fetch (F) protect bit, a line change (LN CH) bit and a page change (PG CH) bit. The most important additional tag bit in the PD for the purposes of this invention is the LN CH bit, which hereafter is referred to as the CH bit which indicates whether or not the corresponding line is changed in the associated SIC.

The manner in which the CD is updated is controlled by the circuits shown in FIG. 8A, which controls the inputs to the CD input register in FIG. 8C that inserts or modifies the entries into the CD array.

In general, each IE sends fetch and store requests to its associated BCE. Store requests are always requested exclusively. Instruction fetch requests are requested readonly; while operand fetch requests are requested exclusively. Under special circumstances, this invention causes the EX tag bit for a required line to be set to RO state in spite of an exclusive operand fetch request by the IE. If an operation fetch is requested exclusively by IE(I), and PD(I) finds the EX bit is off (indicating the conflicting line is held readonly), then the access is permitted in SIC(I), and no cache miss results and no XI operation occurs for the fetch request.

If an IE(I) operand fetch request does not find the address in PD(I), a cache miss results and an XI operation is caused in all CD(R). Whenever a CD(R) finds a conflicting address for a XIed fetch exclusive request command, The SC for that CD(R) must examine its EX tag bit state. If the EX bit for the conflicting line is set to RO state, CD(R) will cause an ATRO (alter to readonly) signal to be transmitted to the SC for CD(I) so that it will communicate with CD(I) and PD(I) to change their EX bit state to readonly, since that EX bit was initially set to EX state by the IE request. But if CD(R) finds its EX bit set to EX state, for the XIed fetch exclusive request command, the SC for CD(R) will transmit an ARO command (as shown in FIG. 3C) to PD(R). The SC command includes the class and set addresses in CD(R) indicating where the conflicting entry was found, and the command contains a castout (CO) command bit, an invalidate (INV) bit, and an alter-to-readonly (ARO) bit the respective line in PD(R). The ARO bit is set to make it an ARO command.

The different types of SC commands (if any) generated for the different situations are indicated in Table 1 herein and depend on the IE request type, the issuing PID, and the setting of the EX bit for any conflicting entry found in a CD(R).

When the SC command is received by BCE(R), the command response provided by BCE(R) is shown in FIG. 3D, and is determined as indicated in Table 1 herein which shows how the BCE command is dependent on the state of the change (CH) tag bit for the line in PD(R). In regard to this invention, the specific command response is dependent upon the command request type, its PID and EX bit state.

If a conflict is found in any CD, the BCE(I) miss command execution is suspended and this command is held in the SC command queue, until BCE(R) responds to the CD(R) command requesting ILE, CO or CERO.

If BCE(R) receives an ARO command and the CH bit is on in PD(R) for the conflicting line, a castout is required from SIC(R), and the castout begins as soon as PD(R) accepts an SC ARO command and finds the CH bit is on for the conflicting line. The BCE responds with a castout (CO) command to the SC which sets the V bit off for the entry in CD(R). If CH is off, the line is unchanged and BCE(R) will reset its EX bit to RO state and issue a CERO (change entry to readonly) command to the corresponding CD(R), in order for the CD(R) to set its corresponding EX bit to RO state for the line. The CERO command will cause the BCE(I) miss command to be taken from the SC command queue and again XI searched.

In response to the CERO command, CD(R) changes its EX bit to RO state. Then the next iteration of the BCE(E) miss command processing will find a RO state in the CD(R) entry, which will cause an ATRO signal to the SC for CD(I) to set the EX bit for the line to RO state. The hardware for this operation is shown in FIGS. 5, 7, 8A, 8B and 8C. Whenever the ATRO signal is received by the issuing CD(I), it generates a ROD (readonly designation) signal which it sends to its corresponding PD(I) to reset its EX bit for that line to the RO state, in order to indicate that the line will thereafter be held in RO state in the issuing processor SIC(I) as well as being in the RO state in each SIC(R) finding the conflict.

All storage commands are handled through several phases of sequencing control in the SC; and at any instant of time, several different phases of different storage commands may be processed concurrently in the SC.

The normal sequencing of BCE fetch and store commands includes the following described operations.

During the same time as the XI operation is being done, the command is also having its PSW storage key checked in the SC for possible key violations, as disclosed and claimed in prior cited U.S. Pat. No. 4,293,910.

Also the SC checks for the availability of the BSM and its controller required by the address in the command, as disclosed and claimed in prior U.S. Pat. No. 4,280,176. If the BSM is not busy, the MS command is sent to the BSM immediately. On the other hand, if the BSM is found to be busy and/or a conflict is found, the command is saved in the SC command queue and the queue array, to be reissued when the BSM becomes available and/or the conflict is resolved. Each time an XI operation iteration is completed, the status for the MS command is again updated in the command queue.

After the BSM controller (BSC) of the required BSM receives the MS command from the SC, the BSC may or may not start the storage access immediately (depending on whether there is a previous storage access in progress). The BSC will signal the SC when a data ready condition exists.

Because of the long memory access time relative to the CP cycle time, by the time the BSC signals data ready, the SC has normally completed all status checking related to the MS command. If directory conflicts or key violations are detected, the MS data transfer phase of the operation is cancelled, and may subsequently be reissued after the conflicting conditions are resolved. However, with most MS commands, no conflict or violation is detected; therefore, the data transfer takes place immediately after the SC has checked that both MS and CPU data transfer paths are not busy.

From one to three lines of main storage access occurs as a result of each BCE miss command. In all cases, the command requires a line fetch from MS to SIC(I). But a cache miss may also require a line castout from SIC(I) in the issuing processor to make room for the required line fetch; and if the XI operation finds the requested line was updated in any SIC(R), the line must be cast out of SIC(R) before it can be received by SIC(I).

The three phases of control described above, namely, BCE command processing, MS access control, and the data transfer, are all independently handled in the SC. The control of each phase can begin processing a new command in that phase as soon as the phase has finished processing the previous command. Therefore, several different commands can be processed concurrently in the SC by its different phase controls.

FIGS. 4A through 4F illustrate timing sequences for a line fetch requiring two line castouts from SIC(I) and SIC(R). FIGS. 4H through 4N illustrate timing sequences for a line fetch requiring only a castout by the issuing processor SIC(I).

FIG. 4A illustrates a cache miss followed by the castout of the sixteen DWs of a valid changed line in SIC(I) to its LSB(I) to make room in SIC(I) for a requested line fetch. The castout uses a line store buffer (LSB) 51 shown in FIG. 5 in order to free up the SIC so that it can immediately thereafter receive the line fetch before the castout line in LSB is stored into MS, which otherwise would delay the line fetch, which thereby is available to CP(I) much earlier than if its DWs were directly transferred from SIC to MS. Thus in the first cycle shown in FIG. 4A, PD(I) is searched and the miss is found at that time, the LRU 42 selects the SIC location to receive the line fetch but it is currently occupied by another valid changed line. Then the occupying line is castout of SIC(I) during the succeeding sixteen cycles to respectively empty the sixteen doublewords from SIC 63 into the LSB 51 (FIG. 5) with the timing shown in FIG. 4A as DW0 through DW15 are transferred from SIC(I) to LSB(I) in the initiating CP. As soon as the last DW of the SIC(I) to LSB(I) is completed, SIC(I) is able to receive the line fetch, which can begin if the XI operations are completed.

In FIG. 4B simultaneously with the SIC(I) castout, the SC receives the BCE miss command in its PIR(I) 103 (the circuits are shown in FIG. 6) two cycles after the BCE received its request from IE(I). On the next cycle, the command is received by XIR(I) 104. When XIR priority is given by circuit 110 on the following cycles, the command is transferred by gate 122 into directory register 121 in the local SC(I), and simultaneously via the XI bus to gate 123 into directory register 121 in each remote SC(R), if any.

Then in FIG. 4C during plural cycles all CDs in the MP are searched for the BCE command address and its synonyms. During the next cycle, all SCs wait for and receive any MP conflict signal, resulting from the searches. If an address conflict is found in any CD(R), and if the EX bit is on for the line, its SC sends an ARO command from register 201 in FIG. 8B to register 65 in FIG. 5 in its BCE(R), as shown by the first cycle in FIG. 4D. In the next cycle, the BCE(R) receiving the ARO command tests the change (CH) bit for the line in PD(R) being addressed by the ARO command.

Figure 16:
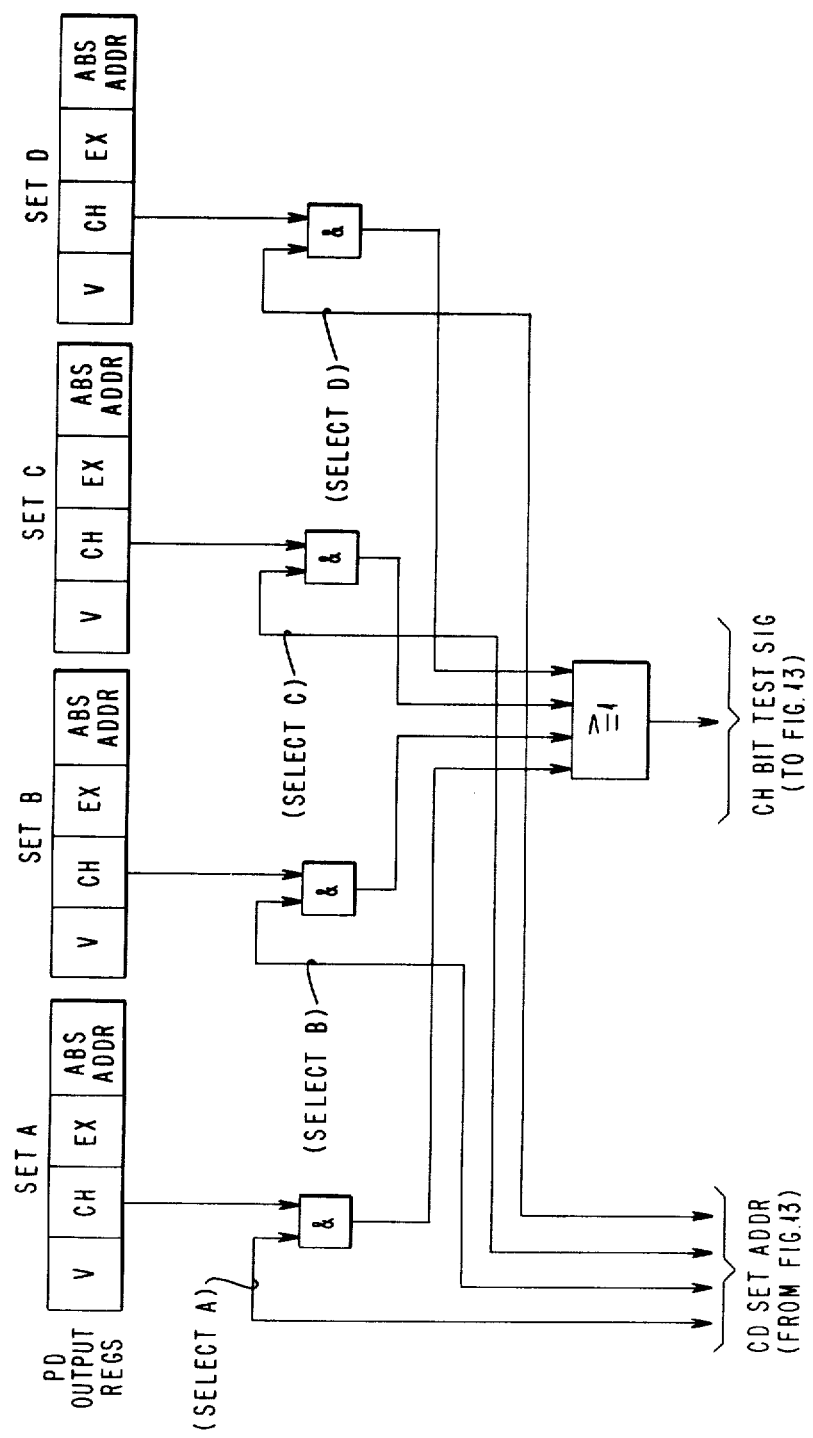
FIG. 16 shows in detail the change bit test circuit in the BCE response controls shown in a block in FIG. 5.

FIG. 16 shows a detailed circuit for testing the state of the CH bit in any selected PD output register.

During the next cycle in FIG. 4D, if the CH bit is on (indicating the line was changed), BCE(R) sends a castout (CO) command from its command register 45 in FIG. 5 to SCR PIR 103; but if the CH bit is off (indicating the line was not changed), this cycle instead has BCE(R) send a CERO command from FIG. 5 to FIG. 6 which is found in the timing example shown in FIGS. 4H–4N.

In FIG. 4D, PD(R) is simultaneously updated by BCE(R) invalidating the entry, and issuing a CO command to SC(R). Then the SC loads its CO register 211 in FIG. 8C, and CD(R) is updated by its SC invalidating the entry. Then during the fourth cycle in FIG. 4D the castout begins by moving DW0 of the addressed line in SIC(R) to LSB(R), etc. until all sixteen DWs of the line are received in the LSB(R), after which in FIG. 4E the LSB(R) provides the updated line to MS from which it is available for a line fetch to the requesting SIC(I) in FIG. 4G since the XI operations in FIG. 4C are probably completed by this time. To check the completion of the XI operations, the first cycle in FIG. 4C is again entered in order to begin the sequence of operations which again searches all CDs in the MP to determine if any conflict still exists, which normally should be found to have been completed at this time. If no conflict is found, the line fetch begins, which is shown in FIG. 4G.

Thus, the line castout from SIC(R) to LSB(B) may overlap the line castout from SIC(I) to LSB(I) if both castouts are required. The requested line fetch from MS shown in FIG. 4G may begin as soon as the castout of the updated line is completed to MS, which is shown in FIG. 4E, i.e. LSB(R) to MS of the sixteen DWs. The line fetch begins with the requested DW(N) which is the DW at address N requested by the IE command which caused the cache miss. The line fetch of the 16DWs may wrap around to the beginning of the line before it ends with the sixteenth DW (N−1) into SIC(I).

The castout transfer from any LSB to MS is controlled by the absolute address of the line in CO address register 211 in FIG. 8C, which is received in the SC from the command currently in its directory register 121 in FIG. 6. When the line castout to MS is complete, the SC signals a CO complete status to BCE(R) which sets its CO complete trigger in FIG. 14 if all conditions indicate the CO is successful and the line is available in MS. The output of the CO complete trigger is provided to a reset input in the CO address register 211 in FIG. 8C in order to make it available for a next castout transfer operation to MS.

The example of a line fetch after a one line castout is shown in FIGS. 4H–4N. FIG. 4H is identical to FIG. 4A; FIG. 4J is identical to FIG. 4B and FIG. 4K is identical to FIG. 4C. FIG. 4L differs from FIG. 4D only in their fourth cycle, in which in FIG. 4L a CERO command is issued by the BCE(R) because the CH bit was off for the line being addressed, which negates any castout from SIC(R). On the last cycle in FIG. 4L, CD(R) has its EX bit updated to RO state by the CERO command, and FIG. 4K is reentered to search all CDs to verify that no conflict now exists.

The SIC(I) castout operation in FIGS. 4H and 4M is controlled the same as previously described for FIGS. 4A and 4F to make room for the line fetch. Likewise the SIC(I) castout operation overlaps the cross-interrogation operation in FIGS. 4K and 4L, and the line fetch command for MS has been provided and is waiting in the SC queue of MS requests. As soon as the SIC(I) castout is completed to LSB(I), and the final XI pass through FIG. 4K finds no conflicts exists, the line fetch can begin from MS to SIC(I) as shown in FIG. 4N.

If no castouts are required when a BCE miss command is issued, the line fetch can begin as soon as the last verifying XI pass is made through FIG. 4K and finds there is no existing conflict.

FIGS. 4C and 4K illustrate the timing for the cross-interrogate operations when the MP system is operating in 4KB page mode, i.e. translation page tables address 4KB page units. In this embodiment, the MP may operate in either 4KB or 2KB page mode in which its page tables may access 4KB units or 2KB units, respectively. The significance of the page mode to the subject invention is that virtual address bits used in the cache directory class address differ between the 4KB and 2KB page modes and affect the number of synonym class addresses which must be XI searched. For 4KB page mode, only bit 19 in the class address is a virtual address bit resulting in two class addresses to be searched. In 2KB mode, bits 19 and 20 in the class address are virtual address bits resulting in four class addresses to be searched. These virtual bits are taken from the logical address before its translation, in order to speed up the cache access time for a requesting CP to a large cache. An adverse result of using virtual bits is that the number of virtual address bits determines the number of synonym classes (as a power of 2) which must be searched in the directory; and the greater the number of virtual bits, the more synonym searching must be done in the directories.

Synonym searching is done in all copy directories (CD). In this embodiment, a separate machine cycle is used simultaneously in all CDs in the MP for searching each original and synonym class of the absolute address in the current BCE miss command. For the 4KB page mode, two cycles are needed to search all CDs for the original and the synonym class. In 2KB page mode, four cycles are needed to search all CDs for the original and three synonym classes. Thus, in FIGS. 4C and 4K showing 4KB mode, the first cycle searches the original class determined by the absolute address virtual bit 19 in the transmitted XI command. During the next cycle, bit 19 is inverted in the class address to select the only synonym class. In 2KB page mode, four cycles of searching are used in which each synonym class is obtained by a different one of four permutations of the value of virtual bits 19 and 20 to search the original and the three synonym classes in all CDs. This searching performs true synonym searching in CD(I) and conflict synonym searching in each CD(R). If a synonym match is obtained in CD(I), the synonym address is transmitted by the SC to BCE(I), which then accesses the request in that synonym address in its SIC(I) and simultaneously releases the BCE miss command and cancels the MS request, and treats the situation as if no miss had occurred. These operations are performed by the circuits in FIG. 9.

If no synonym match is obtained in CD(I), but a match is obtained by a synonym in CD(R), the CD(R) synonym match is handled as a conflict as would occur if a match had occurred with the original class address transmitted in the XI command, and it generates an MP conflict signal. However, the SC ARO command and any BCE command resulting from the synonym conflict will contain the synonym class address instead of the original class address from the XI command being cross-interrogated.

FIGS. 10, 11 and 12 illustrate in detail the CD synonym circuits shown in block form in FIG. 8C which control the synonym searching for 2KB or 4KB page mode. A start XI signal from the XIR priority circuit in FIG. 6 initiates the XI search cycle generation in FIG. 11. The first search cycle for all CDs is of the original class address provided in the current BCE(I) miss command from the directory register 121 in FIG. 6, which occurs during the cycle of operation for trigger/latch T1 in FIG. 11. If the 2KB mode signal is active to FIG. 11, 2KB mode synonym searching is performed during the following cycles by T2, T3 and T4. If the 2KB mode signal is inactive to FIG. 11, then 4KB mode synonym searching is performed and only the additional cycle by T2 is used for searching, which involves two less searching cycles than for the 2KB page mode.

The flip 19 and increment 19, 20 outputs from FIG. 11 are provided to FIG. 10 to control the permutations of bits 19 and 20 to obtain the synonym CD class addresses required for the respective CD search cycles. All four line entries in the four sets in each selected CD class are searched.

Figure 14:
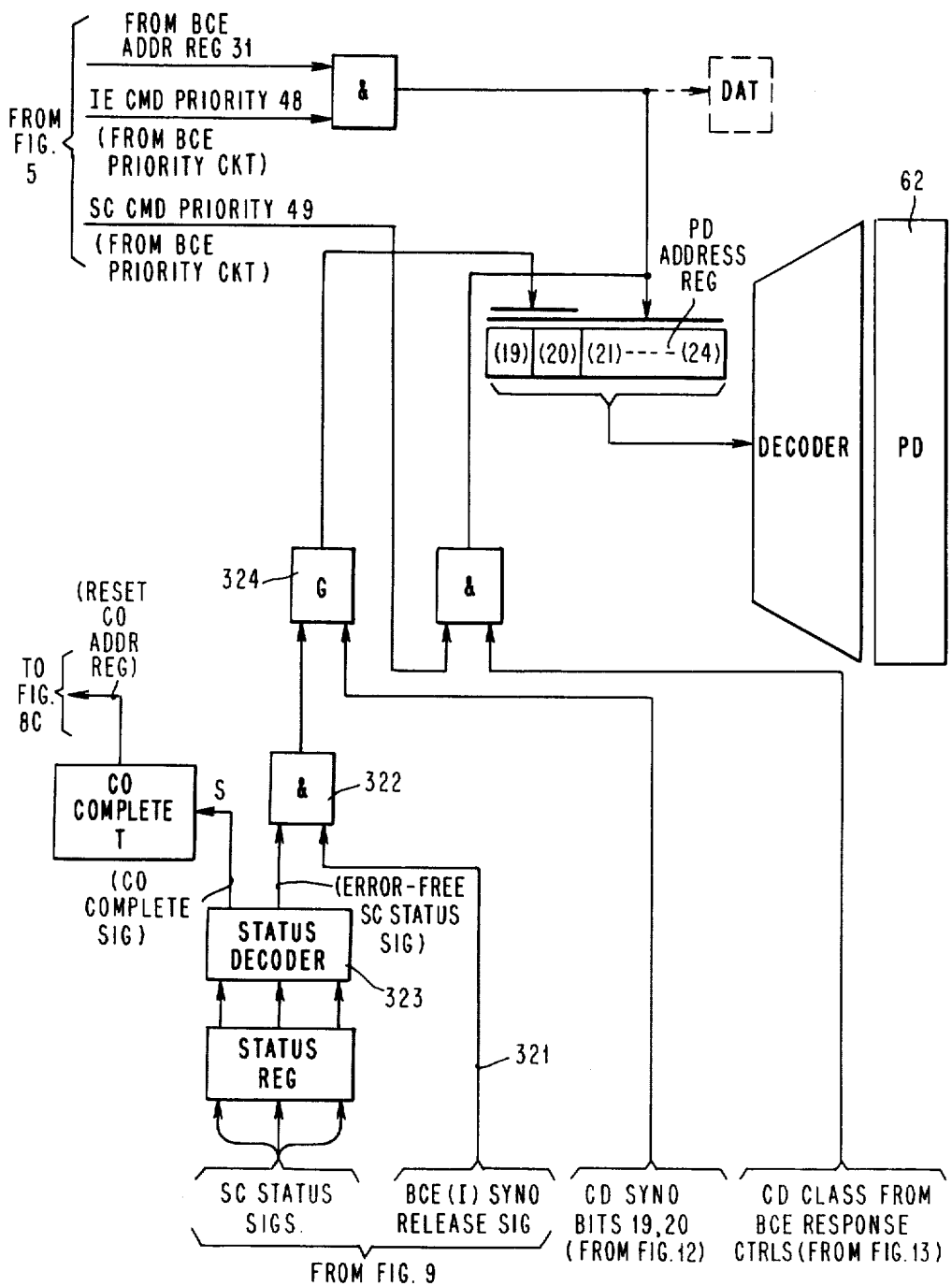
FIG. 14 shows in detail the PD class addressing controls represented in a block in FIG. 5.
Figure 15:
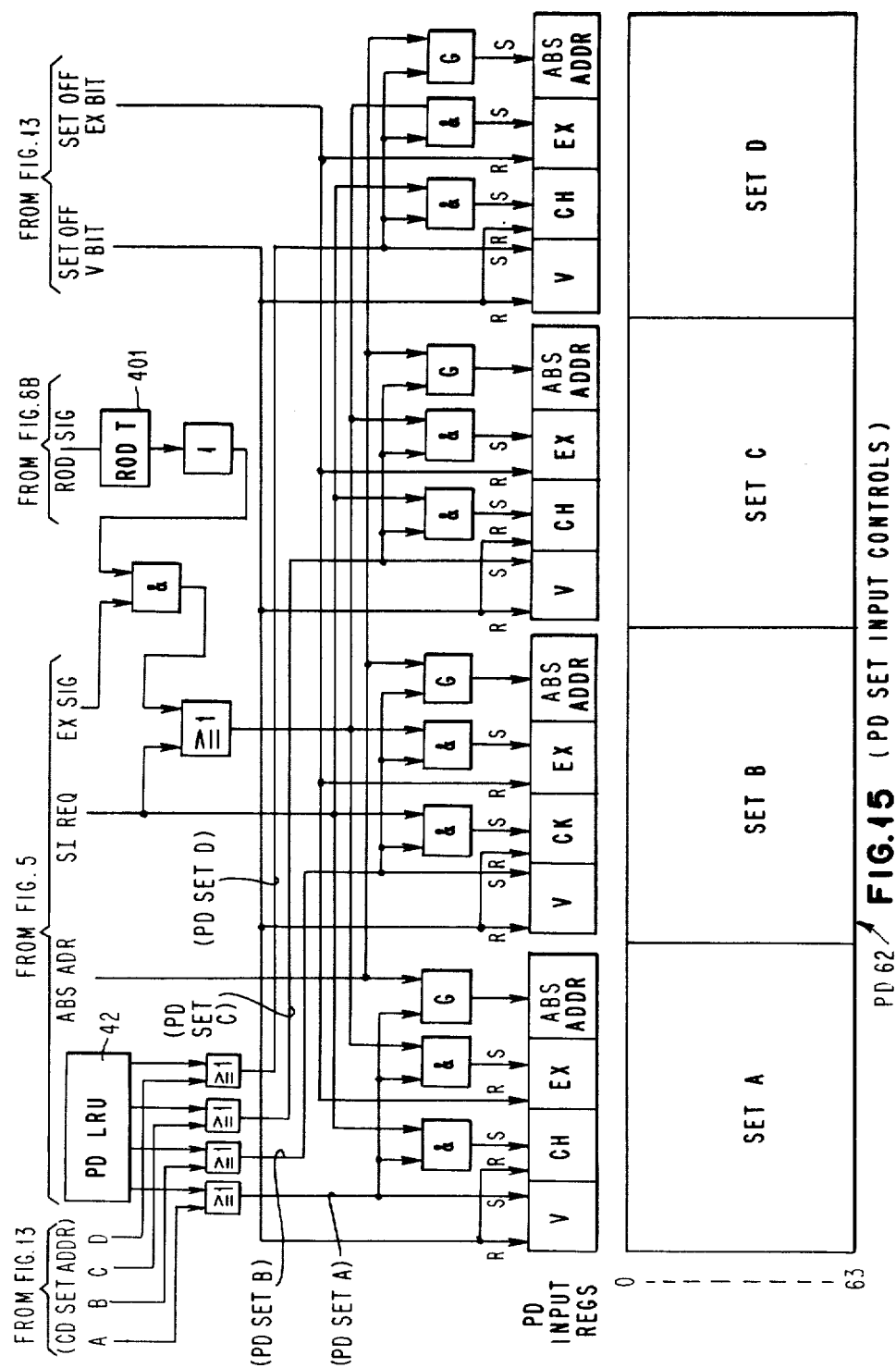
FIG. 15 shows in detail the PD set input controls shown in a block in FIG. 5.

The synonym capture circuit in FIG. 12 receives the current class address bits 19 and 20 from FIG. 10 and also receives the associated CD conflict signal on line 130 from FIG. 8B to lock the current state of class address bits 19 and 20 in syno 19 and syno 20 triggers 301 and 302, which provides their outputs to the PD class addressing control circuits in FIG. 14. The remaining bits 21-24 in the class address remain as specified in the current command being searched.

Although the PD addressing control circuit in FIG. 14 is duplicated in every BCE, only the BCE(I) with the issuing CP will accept a synonym address from FIG. 12. This is because in FIG. 14 a line 321 only provides the BCE(I) synonym release signal to identify a synonym to PD(I) which was found in CD(I). Line 321 will not be activated for any conflict (original or synonym) for any PD(R). Line 321 is controlled from a BCE(I) synonym release trigger 320 in FIG. 9. Trigger 320 is set by a signal from a CD(I) exclusive fetch trigger 142 in FIG. 8A, and trigger 142 is set only when the issuing BCE command in the directory register 45 has a PID which identifies CP(0) as the processor which issued the request which caused the current BCE miss being searched by all CDs. Thus trigger 142 in FIG. 8A can only be set when the issuing command's PID activates line 144 to an AND gate 143 when it is actuated for an exclusive fetch request indicated by that command.

In FIG. 14, line 321 conditions an AND gate 322 which also is conditioned by an output from a status decoder 323 when it indicates an error-free status is being provided from the SC status encoder in FIG. 9.

Thus, line 321 will not be activated to any PD(R), because the PID for each remote CP will not then exist in the current BCE miss command being processed in every SC.

Consequently the detection of a match in a synonym class in any CD(R) is handled the same as the detection of a match in the original class indicated in the current BCE miss command, in that any match generates a conflict signal.

But a synonym match detected in CD(I) is handled differently, and an original class match cannot occur in CD(I) because the lack of such match may be responsible for the issuance of the BCE(I) miss command. When a synonym match is detected in CD(I), it sends a CP(I) exclusive fetch signal on line 141 in FIG. 8A to set the BCE(I) syno release trigger 320 in FIG. 9, which activates AND circuit 322 and gate 324 to pass the captured synonym values of bits 19, 20 into the PD address register so that the PD(I) then accesses this synonym class to find the IE requested data in SIC(I); and the MS request caused by this BCE miss command is cancelled by the output of trigger 320 through OR circuit 326 in FIG. 9. The BCE(I) is thereby released from this BCE miss command and the BCE command register 45 is thereafter available to handle the next command for this BCE.

When the synonym release signal is provided by CD(I), all CD(R) will have completed their XI searching, and no CD(R) will have found any conflict if the synonym entry in CD(I) had its EX bit on. But if the RO bit is on in the CD(I) synonym entry, conflict(s) may be found in one or more CD(R) but no invalidation is performed in this case due to this invention, and a CD(I) ROD signal is provided from FIG. 8B to ROD trigger 401 in FIG. 15 to change the EX bit state in this PD(I) synonym line entry to RO state.

Hence whenever the current CP request activates EX line 24 in FIG. 5 for an exclusive fetch request, an AND gate 136 in FIG. 8B determines that the EX tag bit for the requested line, whether in the original or a synonym class, will be set according to the rules given in Table 1 herein. If the RO state is to exist, gate 136 provides a CD(I) ROD signal on line 137 to the ROD trigger 401 in FIG. 15, which sets the EX bit to RO state in the particular PD input register for the set chosen by the PD LRU circuit associated with the issuing CP(I). The states of the V bit, CH bit and absolute address bits 6–20 for the line fetch entry into PD(I) are also controlled in FIG. 15.

SUMMARY EXAMPLES OF OPERATION OF THE INVENTION

EXAMPLE 1

(Exclusive Fetch Operand Request—No Cache Copy)

CPU(I) issues to its PD(I) a fetch address W requesting the data exclusively. The SC(I) having the copy directory, CD(I), initiates a search of all copy directories (CD0, CD2 in SC0 and CD1, CD3 in SC1) in the MP to determine if any cache in the MP has the line containing address W. Finding no match in any CD, SC(I) accesses MS for the line containing address W, which is sent through SC(I) to the cache for PD(I), with the first sent data item being the requested item at address W. Both directories CD(I) and PD(I) are updated to show that the line at address W is held exclusively in the CP(I) cache.

EXAMPLE 2

(Exclusive Fetch Operand Request—Changed Line In Another CP)

CP(I) issues to its PD(I) a fetch address X requesting the data exclusively. The SC(I) having CP(I) obtains a search of all directories CD0—CD3 for the line having address X. Remote CD(R) finds its SIC holds the line exclusively. Then CD(R) sends a SC command (ARO) to PD(R) to test its change (CH) bit for the line having address X. The PD(R) test finds the line is held exclusive and is changed. Then PD(R) castsout (CO) that line from its cache to MS at address X, which causes both PD(R) and CD(R) to invalidate the line containing address X. Then the SC(I) having CD(I) of the issuing CP(I) fetches the line from MS at address X and sends it to the cache for CP(I). Then directories PD(I) and the CI(I) mark the line containing address X as valid, unchanged, and held exclusively in the CP(I) cache.

EXAMPLE 3

(Exclusive Fetch Operand Request—Unchanged Exclusive Copy In Another CP)

CP(I) issues to its PD(I) a fetch address Y requesting the data exclusively. The SC(I) having the copy directory, CD(I), initiates a search of all copy directories CD0—CD3 for the line containing address Y. A line address is found in CD(R) which matches the requested line address and it is held exclusively in CD(R). Then the SC having CD(R) sends a command to its corresponding PD(R) to test the line containing address Y. PD(R) then tests the state of address Y and finds that although it is held exclusive, it is not changed. In response, PD(R) does not release the line but updates its entry for the line by resetting its exclusive bit to readonly state. Then PD(R) sends a CERO command to its corresponding CD(R) to change the line entry for address Y to readonly state. During another XI search following the CERO command, the SC having CD(R) sends an ATRO (alter to readonly) signal to the SC having CD(I) to change its exclusive tag for the requested line to readonly state. The requested data is fetched in MS at address Y and sent to the cache for PD(I) as the first item of the line, as the line is sent in its entirety from MS to the cache for PD(I). The SC fetching the line signals PD(I) to hold the line readonly.

EXAMPLE 4

(Exclusive Fetch Operand Request—RO Copy In Another CP)

CP(I) issues to its PD(I) a fetch address Z requesting the data exclusively. Then SC(I) initiates a search for the line having address Z in all directories, CD0—CD3. A match is found in CD(R) for a line that is held readonly. The SC having CD(R) sends an ATRO signal to the SC having CD(I) to change its exclusive tag for the requested line to readonly state. Then the requested line is fetched in MS and sent to the cache for PD(I), beginning with the item of data at address Z. A special signal in the SC having CD(I) is sent to PD(I) to tag the line containing address Z is being held readonly.

Although this invention has been shown and described with respect to plural embodiments thereof, it should be understood by those skilled in the art that various changes and omissions in the form and details of the invention may be made therein without departing from the spirit and the scope of the invention.

Having thus described our invention, what we claim as new, and desire to secure by Letters Patent is:

1. A multiprocessor (MP) system having at least two processors, in which each processor has a processor store-in-cache, and a processor cache directory (PD) with a plurality of line entries for corresponding line positions in the associated cache, the MP system further comprising,
    each processor requesting its PD for main storage access with either an exclusive (EX) or readonly (RO) shareability signal,
    an exclusive (EX) bit position, a line change (CH) bit position, a valid (V) bit position, and an address field being provided in each PD line entry, the opposite states of the EX bit position indicating exclusive or readonly shareability for the corresponding line position,
    cache miss detecting means connected to each PD for generating a storage line fetch and cross-interrogation (XI) command from each cache miss, the XI command indicating if the initiating processor request has an exclusive or readonly signal and is a fetch or store request and indicating a main storage address for the request,
    cross-interrogation (XI) means connected to receive each XI command,
    control means connected to receive the output of the XI means and searching valid line entries represented in each other PD in the MP system for detecting any existing conflicting line having the main storage address indicated in the XI command, testing means associated with each PD and connected to receive each XI command for testing the state of the EX bit position in any entry found to represent a conflicting line, and if the EX bit is set to the exclusive state also testing the CH bit for the conflicting line, means connected to each cache for casting out any conflicting line from the associated cache if the testing means senses the CH bit is on, and setting off the V bit position in the associated PD entry for the conflicting line, means in the associated PD for the conflicting line for setting the EX bit position to the readonly state if the CH bit position is off and not casting out the line which then remains valid in its processor cache, inter-cache means connected between the processors in the MP for setting an EX bit position to readonly state in a line entry for the storage line fetch in the PD which generated the XI command when the EX bit position in each entry for the conflicting line is set to readonly state, whereby readonly cache sharing is permitted for the line obtained by the storage line fetch found to have a conflicting line in another cache in a non-changed state, even though the initiating processor request is for exclusive control of the requested data.

2. A MP system as defined in claim 1, further comprising a copy directory (CD) provided for each PD, each CD having respective line entries containing information copied from a related PD, each entry in the CD having a copy of the EX, V and address field found in a corresponding line entry in the related PD, the control means searching all CDs for a line entry in each CD having the main storage address indicated in the XI command being searched.

3. A MP system as defined in claim 2, the control means further comprising plural CD control means for respectively searching each CD for the address in the XI command, and each CD control means generating a conflict signal upon finding a conflicting entry having an address field equal to the address in the XI command.

4. A MP system as defined in claim 3, each CD control means further comprising,

CD command generating means for providing a CD test command to the related PD upon sensing a XI command having a processor fetch request with an exclusive signal and finding the EX bit set to exclusive state in the CD entry for the conflicting line.

5. A MP system as defined in claim 4, the testing means further comprising, test command registering means for receiving the CD test command, and circuit means for testing the state of the CH bit position for the conflicting line in the PD.

6. A MP system as defined in claim 5, further comprising plural buffer control elements (BCEs) respectively associated with the PDs, each BCE receiving each processor request for its associated PD and searching and controlling the associated PD and its cache, and the testing means being contained in each BCE for receiving the CD test command from the related CD.

7. A MP system as defined in claim 6, each BCE further comprising

BCE command generating means for providing a BCE command to the related CD control means for changing a related CD entry to readonly (CERO) state, and the related CD control means receiving the CERO BCE command and setting the EX bit in the related CD entry to readonly state.

8. A MP system as defined in claim 7, the inter-cache means further comprising an alter-to-readonly (ATRO) bistable circuit means associated with each CD and being activated by the related CD control means after the reception of the CERO BCE command from the related BCE, inter-processor bus means for sending the ATRO signal from the CD control means for the CD having a conflict to the CD control means for the processor initiating the XI command, EX control means in the initiating processor for setting the EX bit to readonly state in the line fetch entry in the initiating processor CD and PD in response to a received ATRO signal.

9. A MP system as defined in claim 8, the EX control means further comprising

ROD means with each CD control means for generating a readonly designation (ROD) signal at the end of each XI operation in the CD control means for the initiating processor in response to an ATRO signal being received from any processor CD control means, the EX control means setting the EX bit to readonly state in the line fetch entry in the issuing processor PD when activated by a ROD signal.

10. A MP system having at least two processors, in which each processor has a processor store-in-cache, and a processor cache director (PD) with a plurality of line entries for corresponding line positions in the processor cache, the MP system further comprising, each processor having request means signalling if the processor exclusively requests its PD for a fetch or store access of its cache, an exclusive (EX) bit position, a line change (CH) bit position, a valid (V) bit position, and an address field being provided in each line entry in each PD, means for setting the EX bit position in the assigned line position to exclusive state in response to an exclusive request from the associated processor, PD line request means connected to each PD for being initiated by a processor request which does not find the requested data in the associated processor cache, means for assigning a line position in the associated PD for the requested line to be fetched, means connecting a corresponding copy directory (CD) to each PD for a respective processor, each CD line entry having an EX bit position, a V bit position and an address field set to the same values as a corresponding line entry in the related PD, XI register means connected to each CD for receiving each PD line request identifying the requesting processor, whether the processor request is a fetch or store, the request address, and if requested exclusively or readonly, XI priority means connected to each CD for each PD line request to initiate all CD control means to search all CDs for any conflicting line entry having the request address and to test the state of the EX bit in any conflicting line entry found in any CD.

11. A MP system as defined in claim 10, further comprising means for sending a test command to the PD if the CD control means finds the EX bit is in exclusive state for the conflicting line, means for detecting the state of the CH bit position for the conflicting line entry in the related PD, means for casting out the conflicting line from the associated processor cache if the CH bit is on and thereafter setting off the V bit in each entry for the castout line in the related PD and CD, and PD command means for setting the EX bit position to the readonly state if the CH bit position is off to indicate the conflicting line was not changed and that the conflicting line remains available in the corresponding processor cache, whereby an exclusive processor fetch request causing a cache miss results in simultaneous cache sharing being permitted for the line if it is found in another cache in a non-changed state, although cache sharing is not permitted if the line is found in another cache in a changed state.

12. A MP system as defined in claims 10 or 11, further comprising inter-processor communication means for signalling from the CD control means finding a conflicting line entry to a CD control means for the processor initiating the PD line request, means for activating an alter to readonly (ATRO) signal on said inter-processor communication means when the EX bit in the conflicting line entry is set to readonly state, whether the EX bit for the conflicting entry was found during the CD search to be in the readonly state, or whether the EX bit was found to be in exclusive state and changed to readonly state by a resulting PD command.

13. A MP system as defined in claim 12, the EX control means further comprising

ROD means with the CD control means for the issuing processor generating a readonly designation (ROD) signal at the end of each XI operation in response to an ATRO signal being received from any processor CD control means, EX control means in the issuing processor PD setting the EX bit to readonly state in the line fetch entry in response to the ROD signal.

14. A MP system as defined in claim 12, further comprising at least one system controller having a plurality of CD control means and a corresponding plurality of CDs.

15. A MP system as defined in claim 12, further comprising, a plurality of system controllers, means connecting each system controller to at least one processor in the MP, cross-interrogation bus means being contained in the inter-processor communication means for communicating a XI command from any XI register means to each CD control means.

16. A MP system as defined in claim 14, in which the MP system has one system controller connected to at least two processors in the MP, the system controller containing two CD control means.

* * * * *